United States Patent
Chaugule et al.

(10) Patent No.: US 11,864,267 B2
(45) Date of Patent: *Jan. 2, 2024

(54) METHODS AND APPARATUS FOR EFFICIENT TRANSFER OF MULTIPLE CELLULAR SERVICE CREDENTIALS

(71) Applicant: Apple Inc., Cupertino, CA (US)

(72) Inventors: Raj S. Chaugule, Santa Clara, CA (US); Anish Kumar Goyal, Milpitas, CA (US); Elliot S. Briggs, Santa Cruz, CA (US); Li Li, Los Altos, CA (US); Zexing Shi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,049

(22) Filed: Sep. 23, 2022

(65) Prior Publication Data

US 2023/0018945 A1 Jan. 19, 2023

Related U.S. Application Data

(63) Continuation of application No. 16/997,898, filed on Aug. 19, 2020, now Pat. No. 11,516,650.
(Continued)

(51) Int. Cl.
*H04W 8/20* (2009.01)
*H04W 12/06* (2021.01)

(52) U.S. Cl.
CPC ............ *H04W 8/205* (2013.01); *H04W 12/06* (2013.01)

(58) Field of Classification Search
CPC ..... H04W 8/205; H04W 12/06; H04W 12/40; H04W 4/16; H04W 8/24; H04W 36/0066; H04W 12/35
See application file for complete search history.

(56) References Cited

U.S. PATENT DOCUMENTS 11,516,650 B2 * 11/2022 Chaugule .............. H04W 12/35
2007/0004457 A1 1/2007 Han
(Continued)

FOREIGN PATENT DOCUMENTS

CN 103813302 A 5/2014
CN 106028313 A 10/2016
(Continued)

OTHER PUBLICATIONS

Chinese Patent Application No. 202010900036.0—First Office Action dated Nov. 2, 2021.
(Continued)

*Primary Examiner* — Brandon J Miller
(74) *Attorney, Agent, or Firm* — DICKINSON WRIGHT RLLP

(57) ABSTRACT

This Application describes mechanisms to transfer cellular service plans and associated credentials efficiently between wireless devices. Information regarding transferability of cellular services for SIMs/eSIMs to a wireless device are obtained from locally stored or remotely accessible cellular service information and/or associated mobile network operator (MNO) information. Access to network-based servers to determine transferability and/or to effect transfer can use non-cellular connections when available. Transferability information can be presented to a user to narrow selection of cellular service plans to transfer.

20 Claims, 16 Drawing Sheets

Related U.S. Application Data

(60) Provisional application No. 62/897,914, filed on Sep. 9, 2019.

(56) References Cited

U.S. PATENT DOCUMENTS

| | | |
|---|---|---|
| 2008/0261561 A1 | 10/2008 | Gehrmann |
| 2015/0237496 A1 | 8/2015 | Gao et al. |
| 2017/0048645 A1 | 2/2017 | Yerrabommanahalli et al. |
| 2019/0174299 A1 | 6/2019 | Ullah et al. |

FOREIGN PATENT DOCUMENTS

| | | |
|---|---|---|
| CN | 108353270 A | 7/2018 |
| CN | 109314855 A | 2/2019 |

OTHER PUBLICATIONS

Chinese Patent Application No. 202010900036.0—Notice of Allowance dated Mar. 22, 2022.

* cited by examiner

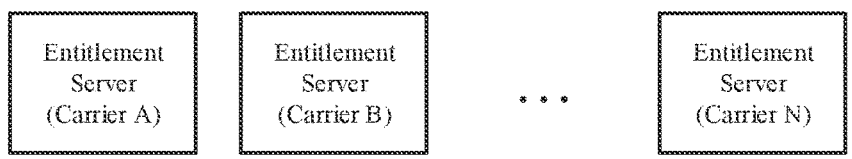
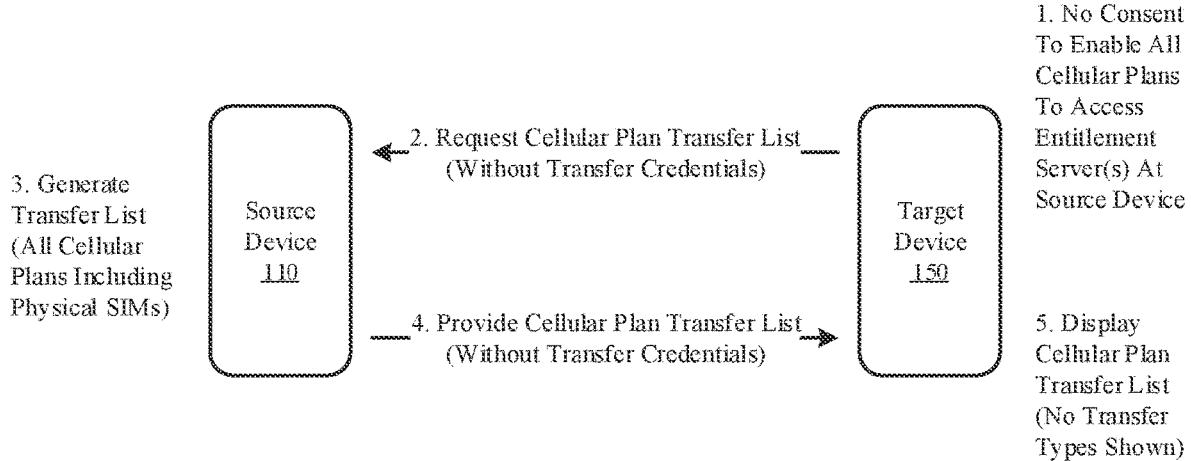
FIG. 3A

350 →

Cellular Plan Transfer List
(No Consent for Disabled eSIM Activation)

500

Cellular Plan Transfer List Data Structures enum TransferType {
    one-click,
    web-sheet,
    account ineligible for transfer,
    out-of-band / Discovery service,
    carrier unsupported for transfer,
    temporary failure}

Transfer Data Per Plan {
    source ICCID,
    (M),
    transfer credentials – token, expiry time, web-sheet post data, // generated at source device
    transfer type, //generated at target device
    carrier descriptors, //MCC, MNC, GID1, GID2
    phone number,
    label,
    additional identifiers}

Transfer Plan List = repeated list (Transfer Data Per Plan)

FIG. 5

METHODS AND APPARATUS FOR EFFICIENT TRANSFER OF MULTIPLE CELLULAR SERVICE CREDENTIALS

CROSS-REFERENCE TO RELATED APPLICATIONS

The present application is a continuation of U.S. patent application Ser. No. 16/997,898, entitled "METHODS AND APPARATUS FOR EFFICIENT TRANSFER OF MULTIPLE CELLULAR SERVICE CREDENTIALS," filed Aug. 19, 2020, issued Nov. 29, 2022 as U.S. Pat. No. 11,516,650, which claims the benefit of U.S. Provisional Application No. 62/897,914, entitled "METHODS AND APPARATUS FOR EFFICIENT TRANSFER OF MULTIPLE CELLULAR SERVICE CREDENTIALS," filed Sep. 9, 2019, the contents of all of which are incorporated by reference herein in their entirety for all purposes.

FIELD

The described embodiments relate to wireless communications, including methods and apparatus to support efficient transfer of cellular wireless services, such as cellular voice and data services authorized by subscriber identity modules (SIMs) and/or electronic SIM (eSIMs), between wireless devices.

BACKGROUND

Newer generation, e.g., fourth generation (4G) and fifth generation (5G), cellular wireless networks, which use newer radio access technology and implement one or more 3rd Generation Partnership Project (3GPP) Long Term Evolution (LTE), LTE Advanced (LTE-A), and 5G standards, are rapidly being developed and deployed by network operators worldwide. The newer cellular wireless networks provide a range of packet-based voice and data services. A user of a wireless device can access services offered by a wireless network service provider, also referred to as a mobile network operator (MNO), based on service subscriptions controlled by authentication credentials included in a profile, also referred to as a subscriber identity module (SIM), when included in a removable universal integrated circuit card (UICC), which is also referred to as a SIM card, or as an electronic SIM (eSIM), when included in an embedded UICC (eUICC) of the wireless device. With a removable UICC and an unlocked wireless device, a user can access different services by replacing the UICC/SIM combination. With a configurable eUICC, eSIMs can be downloaded to the eUICC to access different wireless services. Wireless devices that accommodate multiple UICCs/SIMs and/or multiple eSIMs on an eUICC provide for multiple subscriber identities to be used by the same wireless device to access different services, including services that can span different cellular wireless networks that use different cellular radio access technologies (RATs). A user can transfer cellular services associated with one or more SIMs/eSIMs between wireless devices. Authorization to transfer cellular services for the SIMs/eSIMs can require interaction with network-based servers maintained by corresponding MNOs. As a wireless device can include multiple SIMs/eSIMs, some of which can be in a disabled state, access to multiple, different MNO servers to determine authorization to transfer cellular services can be time-consuming, particularly during initial setup and/or restoration of a wireless device. There exists a need for mechanisms to allow a user to transfer the cellular services associated with multiple SIMs/eSIMs efficiently between wireless devices.

SUMMARY

This Application describes efficient cellular service transfer mechanisms that can be used to move cellular services that are based on cellular service credentials, e.g., SIMs and/or eSIMs, between wireless devices efficiently under various scenarios, including for transfer of multiple eSIMs. To simplify initial configuration or subsequent restoration of a wireless device, a user can seek to transfer cellular services for one or more SIMs/eSIMs from a source device to a target device. Transfer of credentials for cellular service access can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of credentials for cellular service access can also occur via an online network-based service, such as via an iCloud® service, where the devices need not be in proximity to each other. Transfer of cellular service access credentials can also occur via a backup and restore mechanism to and from local or remote storage. A total elapsed time to transfer a set of SIMs/eSIMs can be based on i) the number of SIMs/eSIMs in the set, ii) an amount of time to scan for and attach to an associated cellular wireless network for each of the SIMs/eSIMs, iii) a time to switch between different SIMs/eSIMs, e.g., when only one eSIM can be active at a time, and iv) a time to perform entitlement procedures with a network-based MNO server for an associated SIM/eSIM. As a wireless device can include multiple SIMs/eSIMs, some of which may be in a disabled state, transfer efficiency of some or all of the multiple SIMs/eSIMs can be improved by restricting which SIMs/eSIMs transfer based on user selection as well as based on transferability of the cellular service for the associated SIMs/eSIMs. Cellular wireless access network scanning, camping, and interaction with MNO network-based servers can be reduced by excluding SIMs/eSIMs for which transferability is not supported or not allowed. Information regarding the transferability of the cellular services for SIMs/eSIMs on a wireless device can be obtained from cellular service information and/or associated MNO information stored in the wireless device and/or by using one or more background processes to obtain transferability information while other foreground processes are performed by the wireless device, such as during initial configuration or subsequent restoration of the wireless device. Transferability information for SIMs/eSIMs of the wireless device to another wireless device can be presented, including whether a SIM/eSIM can be transferred, and if not, a reason for non-transferability. A listing of SIMs/eSIMs for transfer can disallow non-transferable SIMs/eSIMs from being selected for transfer. Transfer of a cellular service can require access to a network-based server associated with an MNO for the cellular service. When access to the MNO network-based server can be accomplished via a non-cellular connection, e.g., a Wi-Fi connection, the wireless device can authenticate and perform entitlement procedures with the MNO server without performing a cellular access network scan and attach procedure, thereby saving additional time for transfer of the associated SIM/eSIM.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, where like reference numerals designate like structural elements.

FIGS. 3A and 3B illustrate an exemplary set of actions performed by a source device and a target device and an exemplary user interface display screen to provide a cellular plan transfer list at the target device, according to some embodiments.

FIG. 5 illustrates an exemplary data structures to store information for cellular plan transfers, according to some embodiments.

DETAILED DESCRIPTION

Figure 1:
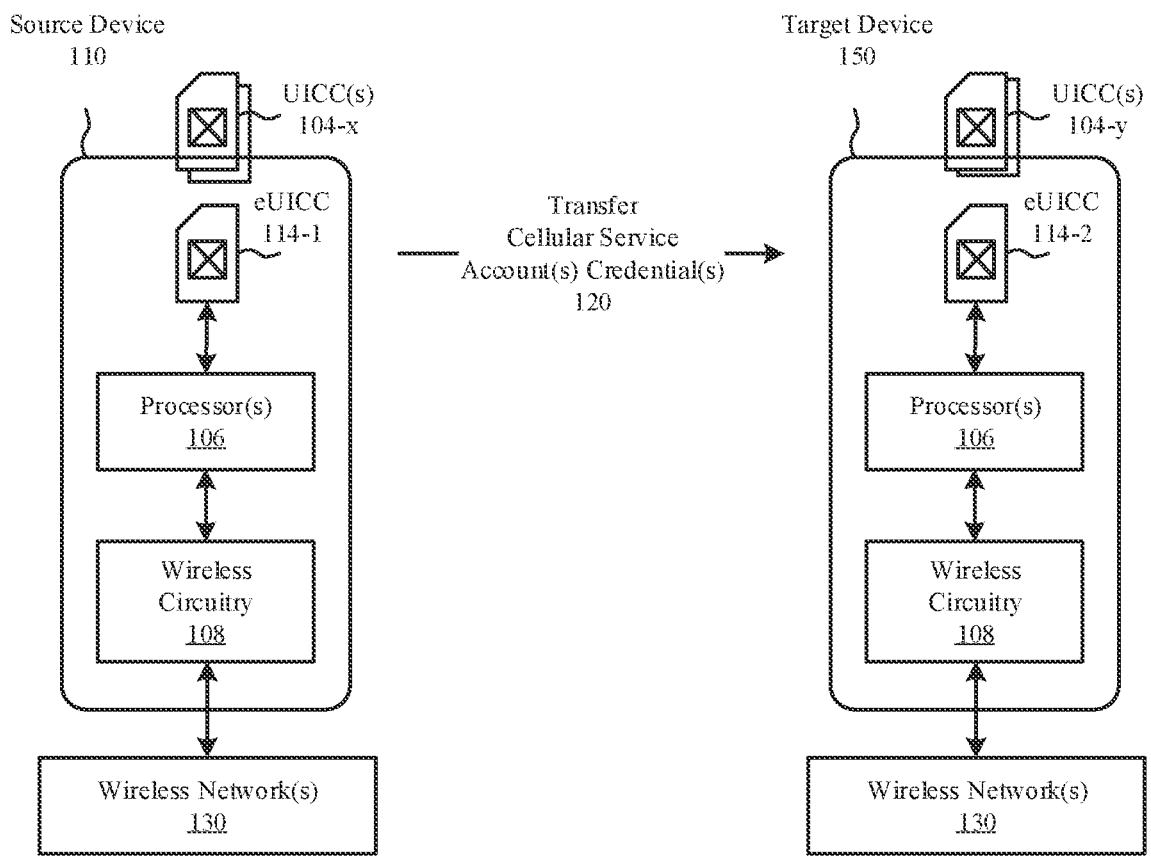
FIG. 1 illustrates a diagram of an exemplary transfer of cellular service account credentials for access to cellular services from a source device to a target device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Cellular wireless capabilities continue to be incorporated into a broad array of electronic devices, including mobile phones, tablets, portable computers, wearable devices, automobiles, etc. Additionally, credentials for access to cellular wireless services are evolving from removable secure Universal Integrated Circuit Cards (UICCs), also referred to as subscriber identity module (SIM) cards, to include electronic SIMs (eSIMs) that can be installed and updated dynamically on secure system boards, such as embedded UICCs (eUICCs). A user can own and use multiple different electronic devices that each have cellular wireless capabilities and can seek to re-use cellular service features and/or settings across multiple cellular-capable electronic devices. For example, when acquiring a new cellular-capable electronic device, a user can seek to transfer cellular credentials from an existing device to the new device in as flexible and efficient a manner as possible. Alternatively, a user can move a physical SIM card between wireless devices and/or transfer an eSIM between wireless devices to use cellular services associated with the physical SIM card and/or the eSIM on another wireless device. This Application describes cellular service transfer mechanisms that can be used to move cellular service credentials, e.g., SIMs and/or eSIMs, between devices efficiently under various scenarios.

A user can seek to transfer credentials for cellular services from a first device, which can be referred to as a source device, to a second device, which can be referred to as a target device. In some embodiments, the user can be associated with a user account, e.g., referenced by a unique identifier, such as an Apple ID, maintained by a network-based online cloud storage service, e.g., iCloud®, and can register each of the source device and the target device with the same user account. The user can seek to transfer the credentials by physically moving a SIM card, e.g., a 4FF card, from the source device to the target device, or by moving credentials for a SIM card of the source device to another SIM card or an eUICC of the target device. Alternatively, and/or additionally, the user can seek to transfer credentials in the form of an eSIM included in an eUICC of the source device to an eSIM in the eUICC of the target device. Devices that include an eUICC can usually support multiple eSIMs, and in some instances, the user can seek to transfer a set of one or more eSIMs from a source device to a target device. Some devices can also include one or more removable SIM cards and one or more eSIMs on an eUICC of the device, and the user can seek to transfer a set of some or all credentials from the SIM card(s) and/or from a set of some or all eSIMs on the eUICC of the device to another device.

Transfer of credentials can occur between two devices that are within proximity of each other, e.g., where the devices can connect securely via a local connection, such as via a wireless personal area network (WPAN) connection, via a wireless local area network (WLAN) connection, via a peer-to-peer connection, or the like. Transfer of credentials can also occur via an online network-based service, such as via an iCloud® service, where the devices need not be in proximity to each other. Transfer of cellular service credentials can also occur via a backup and restore mechanism to and from local or remote storage. In any of these scenarios, transfer of credentials can include communication between the source device, the target device, and/or one more network-based servers, which can include mobile network operator (MNO) managed servers, such as an entitlement server, a web-sheet server, an authentication server, a provisioning server, a subscription management data preparation (SMDP+) server, a home subscriber server (HSS), a billing services server (BSS), and/or an authentication server, as well as third-party managed servers, such as a cloud storage service server, a push notification services server, a discovery service server, and/or an identification services server.

An amount of time to transfer a set of SIMs/eSIMs from a source device to a target device can be based on a number of factors including (i) the number of SIMs/eSIMs on the source device, (ii) an amount of time to scan for and attach to an associated cellular wireless access network for each of the SIMs/eSIMs, (iii) a time to switch between different SIMs/eSIMs at the source device, e.g., when only one eSIM can be active at a time, and (iv) a time to perform authentication and entitlement procedures with a network-based MNO server for an associated SIM/eSIM. As the source device can include multiple SIMs/eSIMs, some of which may be in a disabled state, transfer efficiency for some or all of the multiple SIMs/eSIMs can be improved by restricting which SIMs/eSIMs are transferred (and for which information to effect transfer of the SIMs/eSIMs may be required). The source device can maintain transferability information for some or all of the multiple SIMs/eSIMs stored thereon, where the transferability information can be obtained from MNO information provided to the source device, such as during installation of a SIM/eSIM or in a carrier bundle, or obtained by the source device from an network-based server maintained by an MNO and/or by a third-party provider. In some embodiments, a user can select which of multiple SIMs/eSIMs to transfer from the source device to the target device. In some embodiments, information about transferability of SIMs/eSIMs can be presented to a user via a display of the source device and/or via a display of the target device to assist with narrowing selection of SIMs/eSIMs to transfer. Cellular wireless access network scanning, camping, and interaction with MNO network-based servers can be reduced by excluding SIMs/eSIMs for which transferability is not supported or not allowed. In some embodiments, non-transferable SIMs/eSIMs can be non-selectable and information regarding non-transferability can be presented to the user. In some embodiments, transfer of some SIMs/eSIMs can be accomplished by separate means and/or based on additional interaction by a user with an MNO web-site after completion of a setup or restoration process for the target device. Different mechanisms by which a transfer of a SIM/eSIM can be accomplished can be presented to a user. An MNO can require interaction by the user, e.g., by communicating with an MNO web-sheet server via the source device and/or via the target device. In some scenarios, cellular service for a SIM/eSIM may be supported on the source device but may be not supported by the target device. In some scenarios, an MNO can restrict transfer of cellular service between devices. To improve transfer efficiency during an initial setup process or during a device restoration process, the source device and/or the target device can use one or more background processes to obtain transferability information while other foreground processes are performed. In some embodiments, permission from a user via the source device and/or the target device can be obtained before enabling one or more eSIMs to obtain transferability information from an MNO server. In some embodiments, information presented to a user regarding transferability of SIMs/eSIMs can be based at least in part on whether the user provided permission to enable SIMs/eSIMs to obtain transferability information from one or more MNO network-based servers. In some scenarios, transfer of a cellular service can require access to a network-based server associated with an MNO for the cellular service. When access to the MNO network-based server can be accomplished via a non-cellular connection, e.g., a Wi-Fi connection, the source device and/or the target device can authenticate and perform entitlement procedures with the applicable MNO server without performing a cellular access network scan and attach procedure, thereby saving additional time for transfer of one or more associated SIMs/eSIMs.

These and other embodiments are discussed below with reference to FIGS. 1 through 8; however, those skilled in the art will readily appreciate that the detailed description given herein with respect to these figures is for explanatory purposes only and should not be construed as limiting.

FIG. 1 illustrates a diagram 100 of an exemplary transfer 120 of cellular service account credentials for access to cellular services from a source device 110 to a target device 150 where the source device 110 and the target device 150 may be within proximity of each other to establish a direct secure connection between them or may be separated by a distance where transfer occurs via an indirect connection, such as over a wireless local area network (WLAN) and/or via one or more cellular wireless networks 130. Transfer of credentials that permit access to services of cellular wireless networks 130, as referred to herein, regards the transfer of one or more subscriber identify modules (SIMs) on UICCs 104 and/or transfer of one or more virtual credentials, such as one or more electronic subscriber identity modules (eSIMs), also referred to as profiles or plans herein, from a source device 110 to a target device 150. For example, a UICC 104-x of the source device 110 can be physically removed from the source device 110 and inserted into the target device 150. Alternatively, one or more eSIMs may be initially present on the eUICC 114-1 and/or on an eUICC 114-x of the source device 110, and a user may seek to transfer one or more of the eSIMs from the source device 110 to the eUICC 114-2 and/or to a UICC 104-y of the target device 150. The eSIMs may be associated with one or more cellular service accounts for one or more cellular service providers, also referred to as mobile network operators (MNOs). Transfer of eSIMs may occur without requiring the user to remove the UICC 104 from the source device 110 or to replace the UICC 104 of the target device 150. As illustrated, the source device 110 and the target device 150 can each include one or more processors 106 and wireless circuitry 108 to communicate with one or more cellular wireless networks 130. The SIMs and/or eSIMs that are transferred can allow the target device 150 to access cellular services for one or more cellular wireless networks that previously were accessible by the source device 110. A determination of which SIMs/eSIMs may be transferred, means by which the SIMs/eSIMs may be transferred, and/or whether to transfer SIMs/eSIMs can be based on (i) information obtained from a user of the originating source device and/or the receiving target device, (ii) information regarding transferability of eSIMs obtained from MNO information and/or specific SIM/eSIM information stored in the source device and/or in the target device, and/or (iii) information retrieved from one or more network-based servers, such as servers maintained by MNOs and/or by third-parties.

Figure 2:
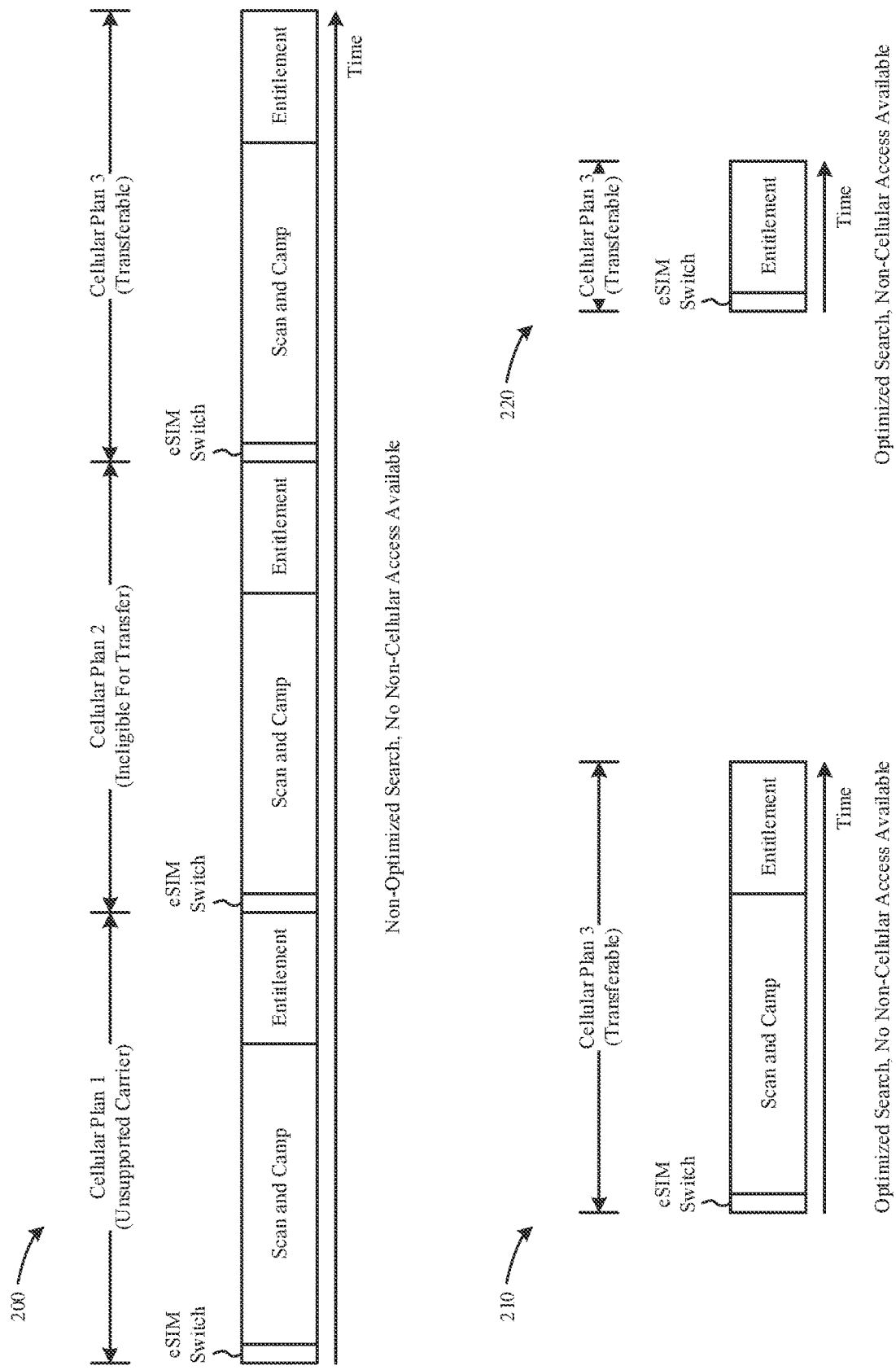
FIG. 2 illustrates diagrams of exemplary times for transferring SIM/eSIM credentials from a source device to a target device, according to some embodiments.

FIG. 2 illustrates three diagrams 200, 210, 220 of exemplary times for transferring SIM/eSIM credentials from a source device 110 to a target device 150. Diagram 200 illustrates a non-optimized timeline in which the source device 110 determines transferability for three different eSIMs associated with three cellular plans. In the scenario illustrated by diagram 200, each of the three eSIMs are initially in a disabled state, and a non-cellular access wireless network is not available by which to communicate with network-based servers to determine transferability of the eSIMs. Additionally, the source device 110 can be restricted to enable only one eSIM at a time. The source device 110 can switch between a currently enabled first eSIM and a currently disabled second eSIM by disabling the first eSIM and subsequently enabling the second eSIM, as indicated by the block labeled "eSIM Switch" in diagram 200. The source device 110 can scan for and camp on a cellular wireless access network associated with the enabled eSIM, indicated by the block labeled "Scan and Camp" in diagram 200. The source device 110 can then communicate with a network-based server, e.g., an entitlement server, to authenticate the source device 110 with the server and obtain information regarding transferability of the enabled eSIM from the entitlement server. The time for communication with the entitlement server is shown as the block labeled "Entitlement" in diagram 200. The source device 110 may not know a priori whether the enabled eSIM may be transferred to the target device 150 and can communicate with the network-based server to ascertain whether the enabled eSIM may be transferred. In diagram 200, the eSIM for cellular plan 1 is associated with an MNO (carrier) that does not support transferring the eSIM from the source device 110 to the target device 150. Additionally, the eSIM for cellular plan 2 is ineligible for transfer, while the eSIM for cellular plan 3 is transferable. The total time to determine transferability of the three eSIMs is lengthened by scanning for, attaching to, and communicating with servers of cellular wireless networks for which some associated eSIMs cannot be transferred. Time to transfer eSIMs can be improved by determining a status of transferability prior to the transfer process, e.g., prior to actual transfer, so that eSIMs that are not transferable are skipped. In some embodiments, the source device 110 pre-determines transferability of an eSIM based on information contained in a carrier bundle received from a network-based server, e.g., an MNO server or a third-party server. The carrier bundle can be a configuration file that is stored on the source device 110, is specific to a particular MNO (carrier), and applies to one or more SIMs/eSIMs of the source device 110 that are associated with the particular MNO (carrier). In some embodiments, the carrier bundle is provided for installation of one or more eSIMs or for an update to one or more eSIMs. In some embodiments, the source device 110 maintains a transferability status for one or more SIMs/eSIMs resident in the source device 110, including in some scenarios for SIMs/eSIMs that are disabled. In some embodiments, the source device 110 determines a transferability status for a SIM or an eSIM based on communication with an entitlement server and stores information regarding the transferability of the SIM/eSIM for use during a future transfer of SIMs/eSIMs. In some embodiments, transferability of cellular service for a SIM/eSIM depends on whether an associated MNO (carrier) supports such transfers. In some embodiments, transferability of cellular service for a SIM/eSIM depends on whether a cellular service account associated with the SIM/eSIM supports such transfers. In some embodiments, transferability of cellular service for a SIM/eSIM depends on whether active user data is mapped to an inactive SIM/eSIM, in which case transfer authorization from an entitlement server may fail. Timeout mechanisms can be used to overcome stalled authorization procedures with an entitlement server, so that the inactive SIM/eSIM can be skipped over during the transfer process. Diagram 210 illustrates an optimized timeline in which cellular plan 1 (for which an associated carrier does not support transfer of the eSIM) and cellular plan 2 (for which the associated cellular service account is ineligible for transfer) are excluded from a transfer process, while cellular plan 3 is enabled, the associated cellular wireless access network is scanned for and camped on, and communication for transfer with a network-based server, e.g., an entitlement server, of the associated MNO for cellular plan 3 occurs. Diagram 220 includes further optimization where a non-cellular wireless access network is available for communication by the source device 110 to the MNO's network-based server, thereby eliminating the scan and camp time required to access the cellular wireless access network.

Figure 3B:
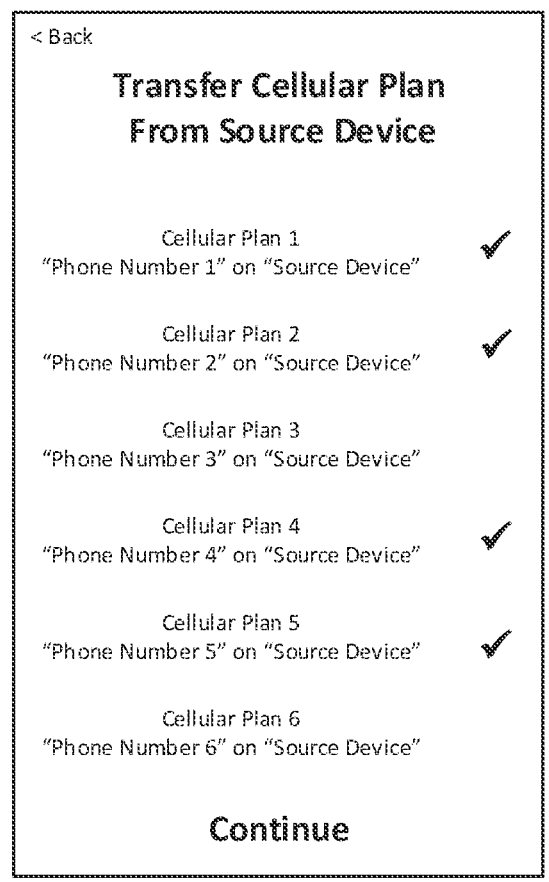

FIGS. 3A and 3B illustrate diagrams 300, 350 for generation and display of transferability information for one or more SIMs/eSIMs of a source device 110 where a user does not provide consent to enable SIMs/eSIMs for determining transferability of cellular service plans from the source device 110 to a target device 150. In diagram 300, a cellular service plan transfer list is generated at the source device 110 and provided to the target device 150. The source device 110 includes one or more SIMs and/or one or more eSIMs, where each SIM and eSIM are associated with a respective MNO (carrier) that maintains at least one network-based entitlement server. Multiple SIMs and/or eSIMs can be associated with the same MNO or with different MNOs. A user may seek to transfer one or more SIMs and/or one or more eSIMs from the source device 110 to the target device 150. The user may indicate, e.g., via an interface of the target device 150, no consent to enable cellular plans at the source device 110 to access one or more associated entitlement servers in order to determine transferability of the one or more SIMs and/or eSIMs from the source device 110 to the target device 150. Obtaining consent from a user on whether to access one or more entitlement servers for authorization to transfer cellular service of associated SIMs/eSIMs can be in accordance with a privacy policy or procedure to improve transparency and allow the user to control access to information that the user may consider private. The target device 150 can be in communication with the source device 110, e.g., via a direct peer-to-peer connection, via a wireless local area network (WLAN) connection, or via another wireless or wired connection. The target device 150 can provide a message to the source device 110 requesting a list of cellular service plans that are potentially available to transfer from the source device 110 to the target device 150. The message sent from the target device 150 can include an indication that the user does not consent to enable SIMs/eSIMs in order to determine transferability of the SIMs/eSIMs to the target device 150. The source device 110 can generate a list of potentially transferrable SIMs/eSIMs, where the list can include all SIMs/eSIMs on the target device 150 in some embodiments. The source device 110 can provide the generated list to the target device 150, which can display, e.g., via an interface of the target device 150, a cellular plan transfer list based on the list provided by the source device 110. In some embodiments, no information regarding transfer types may be shown in the cellular plan transfer list displayed at the target device 150. Based on the user providing no consent for enabling SIMs/eSIMs to communicate with associated MNO network-based servers, the source device 110 may have only limited information (or no information) regarding transferability of the SIMs/eSIMs to provide to the target device 150. In some embodiments, the source device 110 provides limited information (or no information) regarding transferability of SIMs/eSIM to the target device 150. As illustrated by diagram 350 in FIG. 3B, the target device 150 can provide a summary list of cellular service plans potentially available to transfer from the source device 110 to the target device 150. A user of the target device 150 can select from the listed cellular service plans those that the user seeks to transfer from the source device 110 to the target device 150. Limited information (or no information) regarding whether the listed cellular service plans can be transferred from the source device 110 to the target device 150 may be presented via the cellular service transfer list shown via the display of the target device 150. In some embodiments, limited information that is available at the source device 110 without contacting associated MNO network-based servers, after receipt of the message requesting the transfer list, can be provided to the target device 150 by the source device 110. For example, information that was previously provided to obtained by the source device 110 regarding transferability of one or more SIMs/eSIMs can be provided by the source device 110 to the target device 150 to present with the list of cellular service plans available at the source device 110. In some embodiments, each cellular service plan is identified by a unique identifier in the cellular transfer list, such as an associated mobile station international subscriber directory number (MSISDN), which can also be referred to as a phone number for the associated cellular service plan.

Figure 4A:
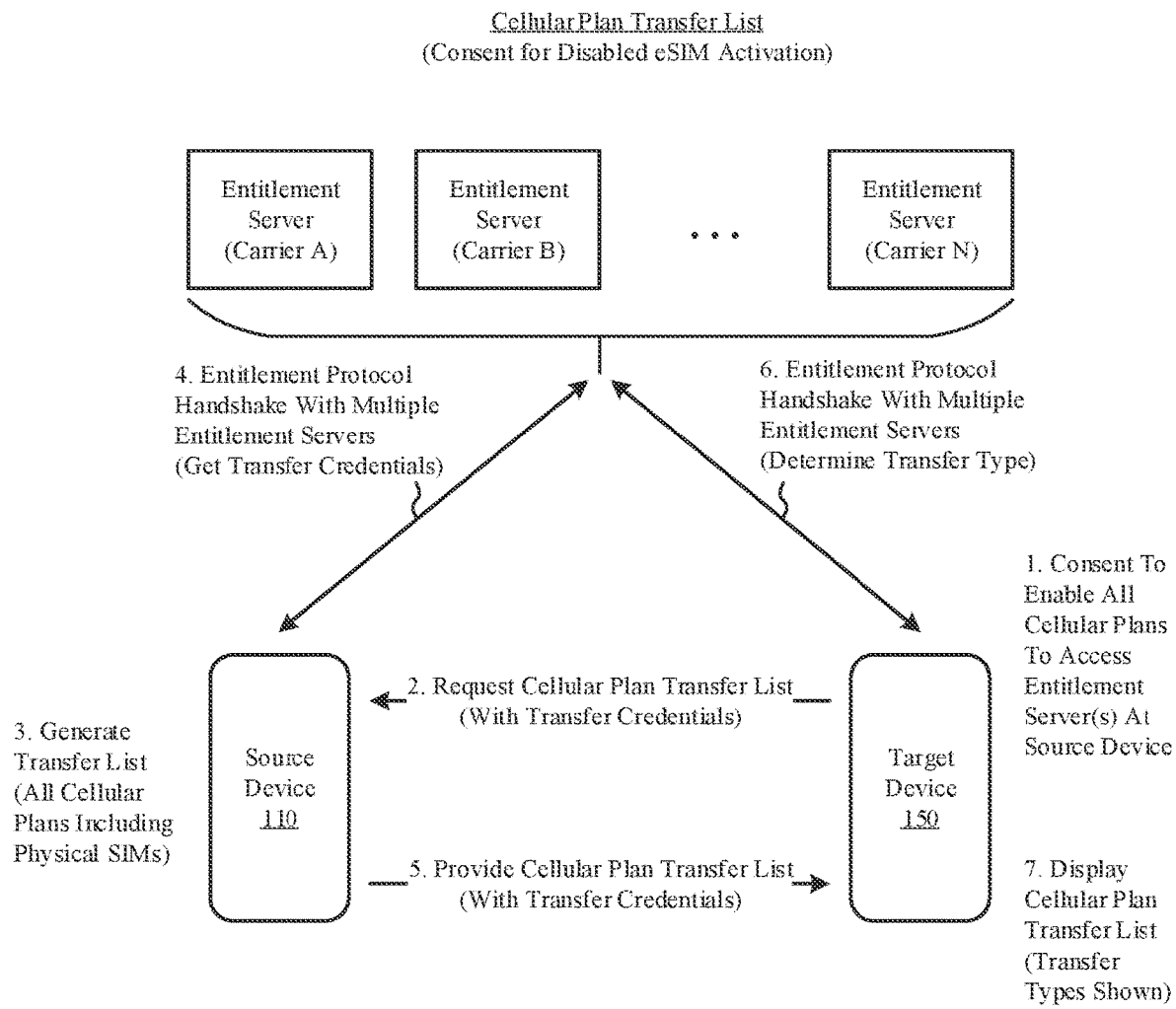
FIGS. 4A and 4B illustrates an exemplary set of actions performed by a source device and a target device and an exemplary user interface display screen to provide a cellular plan transfer list with transfer type information at the target device, according to some embodiments.
Figure 4B:
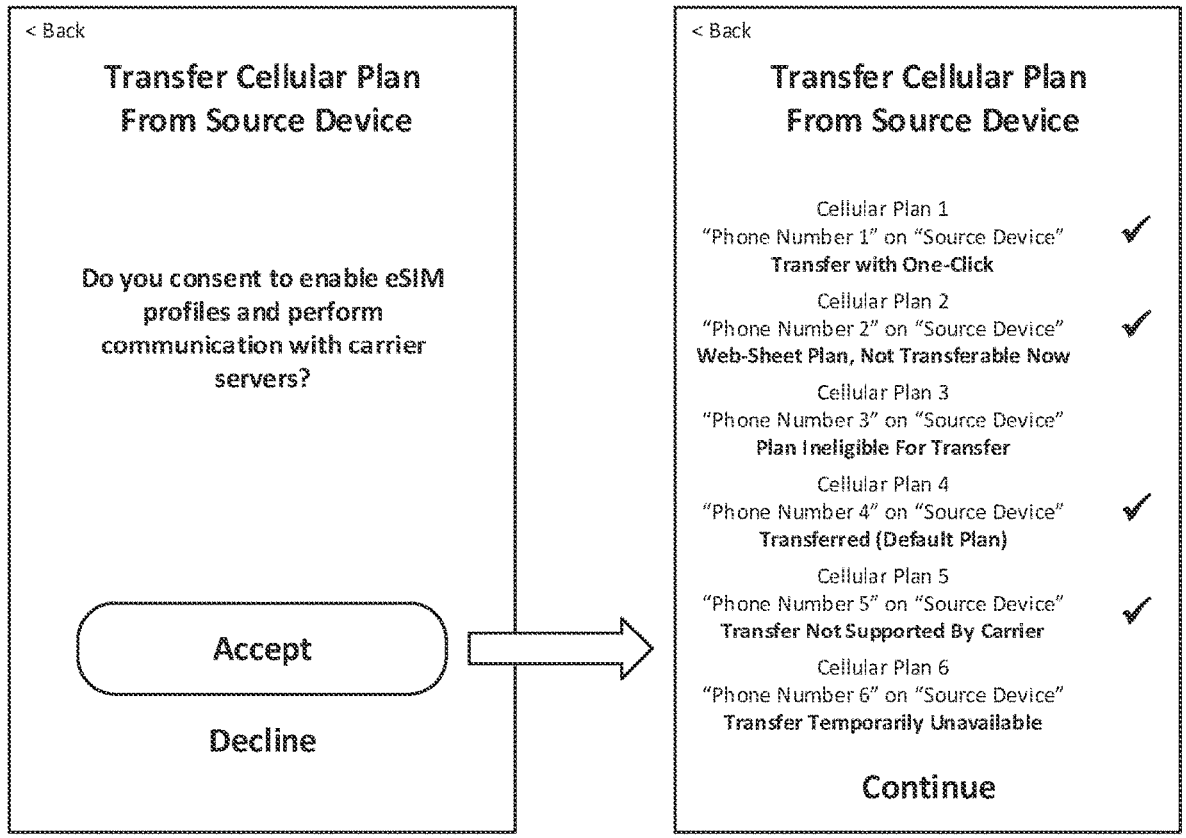

FIGS. 4A and 4B illustrate diagrams 400, 450 for generation and display of transferability information for one or more SIMs/eSIMs of a source device 110 where a user does provide consent to enable SIMs/eSIMs for determining transferability of cellular service plans from the source device 110 to a target device 150. In diagram 400, a cellular service plan transfer list is generated at the source device 110 and provided to the target device 150. The source device 110 includes one or more SIMs and/or one or more eSIMs, where each SIM and eSIM are associated with a respective MNO (carrier) that maintains at least one network-based entitlement server. A user may seek to transfer one or more SIMs and/or one or more eSIMs from the source device 110 to the target device 150. The user may indicate, e.g., via an interface of the target device 150, consent to enable cellular plans at the source device 110 to access one or more associated entitlement servers in order to determine transferability of the one or more SIMs and/or eSIMs from the source device 110 to the target device 150. The target device 150 can be in communication with the source device 110, e.g., via a direct peer-to-peer connection, via a wireless local area network (WLAN) connection, or via another wireless or wired connection. The target device 150 can provide a message to the source device 110 requesting a list of cellular service plans that are potentially available to transfer from the source device 110 to the target device 150. The message sent from the target device 150 can include an indication that the user consents to enable SIMs/eSIMs in order to determine transferability of the SIMs/eSIMs to the target device 150. In some embodiments, only one eSIM in the source device 110 can be active at any one time, and the source device 110 can sequentially enable one or more eSIMs to communicate with associated entitlement servers to obtain information relevant to transferability of the eSIM from the source device 110 to the target device 150. In some embodiments, the source device 110 obtains transfer credentials, when obtainable, from entitlement servers for the SIMs/eSIMs of the source device 110. The source device 110 can generate a list of transferrable SIMs/eSIMs, where the list can include all SIMs/eSIMs on the target device 150, in some embodiments. The source device 110 can communicate with associated MNO entitlement servers for the SIMs/eSIMs before providing the cellular service plan transfer list to the target device 150 to determine transferability of the SIMs/eSIMs. Multiple SIMs and/or eSIMs can be associated with the same MNO or with different MNOs. The source device 110 can use information obtained from the entitlement servers to determine whether a SIM/eSIM can be transferred to the target device 150. In some embodiments, the source device can determine a type of transfer for the SIMs/eSIMs of the source device 110 and provide information regarding the type of transfer to the target device 150 with the cellular plan transfer list. In some embodiments, the source device 110 obtains transfer credentials from associated entitlement servers for transferrable SIMs/eSIMs and provides the transfer credentials to the target device 150, e.g., with the cellular plan transfer list. In some embodiments, the target device 150 communicates with associated entitlement servers to obtain transferability information, which can be used to determine a display a transfer type for the SIMs/eSIMs included in the cellular plan transfer list obtained from the source device 110. The source device 110 can provide the generated list to the target device 150, which can display, e.g., via an interface of the target device 150, the cellular plan transfer list based on the list provided by the source device 110. In some embodiments, information regarding transfer types may be shown in the cellular plan transfer list displayed at the target device 150. Based on the user providing consent for enabling SIMs/eSIMs to communicate with associated MNO network-based servers, the source device 110 and/or the target device 150 may obtain information from associated entitlement servers regarding transferability of the SIMs/eSIMs. As illustrated by diagram 450 in FIG. 4B, the target device 150 can provide a summary list of cellular service plans potentially available to transfer from the source device 110 to the target device 150 including information regarding a transfer type for one or more SIMs/eSIMs. A transfer type for a SIM/eSIM can indicate whether a cellular service plan associated with the SIM/eSIM can be transferred from the source device 110 to the target device 150. The transfer type for the SIM/eSIM can also indicate a transfer mechanism that may be used to transfer the cellular service plan associated with the SIM/eSIM from the source device 110 to the target device 150. Exemplary transfer types can include: i) transfer available with one-click, ii) transferable not available now, web-sheet interaction required, iii) cellular service plan ineligible to transfer, iv) cellular service plan transfer not supported by MNO (carrier), v) cellular service plan temporarily unavailable. In some embodiments, SIMs/eSIMs that are able to be transferred can be selected for transfer. A user of the target device 150 can select from the listed cellular service plans those that the user seeks to transfer from the source device 110 to the target device 150. In some embodiments, each cellular service plan is identified by a unique identifier in the cellular transfer list, such as an associated mobile station international subscriber directory number (MSISDN), which can also be referred to as a phone number for the associated cellular service plan.

FIG. 5 illustrates a diagram 500 of exemplary cellular plan transfer list and transfer type data structures that can be used by the source device 110 and/or the target device 150. As described above, transfer types for SIMs/eSIMs can be categorized, and a "transfer type" data structure can include options that are selectable for indicating a transfer type for a SIM/eSIM. Exemplary transfer types illustrated in FIG. 5 include: i) "one-click", which can refer to a transfer of a SIM/eSIM that can be accomplished by a user agreeing to transfer the SIM/eSIM using a selection via a displayed cellular service plan transfer list, such as at the target device 150, ii) "web-sheet", which can indicate that transfer of the SIM/eSIM requires interaction with a web-sheet server managed by an MNO (or third-party for the MNO) associated with the SIM/eSIM, iii) "account ineligible for transfer", which can indicate that the cellular service plan (and/or its associated cellular service account) is not eligible for transfer from the source device 110 to the target device 150, iv) "out-of-band/discovery service", which can indicate that transfer of the SIM/eSIM can require interaction with a third-party server in order to effect transfer from the source device 110 to the target device 150, v) "carrier unsupported for transfer", which can indicate that the associated MNO for the SIM/eSIM does not support transfer of the SIM/eSIM from the source device 110 to the target device 150, and vi) "temporary failure", which can indicate that transfer type for the SIM/eSIM can be not determined, such as when an entitlement server for the SIM/eSIM is not reachable by the source device 110 and/or by the target device 150.

Transferability can depend on MNO requirements, such as policies associated with the SIMs/eSIMs and/or cellular service accounts, and/or based on mobile device requirements, such as compatibility of the mobile device with a SIM/eSIM and/or with the cellular wireless networks for the MNO associated with the SIM/eSIM.

A source device 110 can communicate a cellular plan transfer list to a target device 150 using a list that includes, for each cellular service plan included in the list, a "transfer data per plan" data structure that enumerates information about the cellular service plan. Additionally, information in the cellular plan transfer list can be modified and/or supplemented by the target device 150. In some embodiments, a data structure for each cellular service plan (eSIM/SIM) includes one or more of the following: i) an integrated circuit card identifier (ICCID) associated with the SIM/eSIM at the source device 110, ii) one or more transfer credentials obtained from the entitlement server and/or generated by the source device 110 for the SIM/eSIM, iii) a transfer type descriptor as discussed above, which can be generated at the target device 150, iii) MNO descriptors, such as a mobile country code (MCC), mobile network code (MNC), group identifier level 1 (GID1), group identifier level 2 (GID2), iv) a mobile station international subscriber directory number (MSISDN), also referred to as a "phone number", v) a label associated with the SIM/eSIM, such as may be provided by a user at the source device 110 and/or at the target device 150 prior to and/or as part of a transfer process, and vi) additional identifiers. Exemplary transfer credentials can include a token, which may a one-time use token, for transferring the cellular service data plan, an expiry time, which can limit a time period when the token can be used for transfer of the cellular service data plan, and web-sheet post data.

Figure 6A:
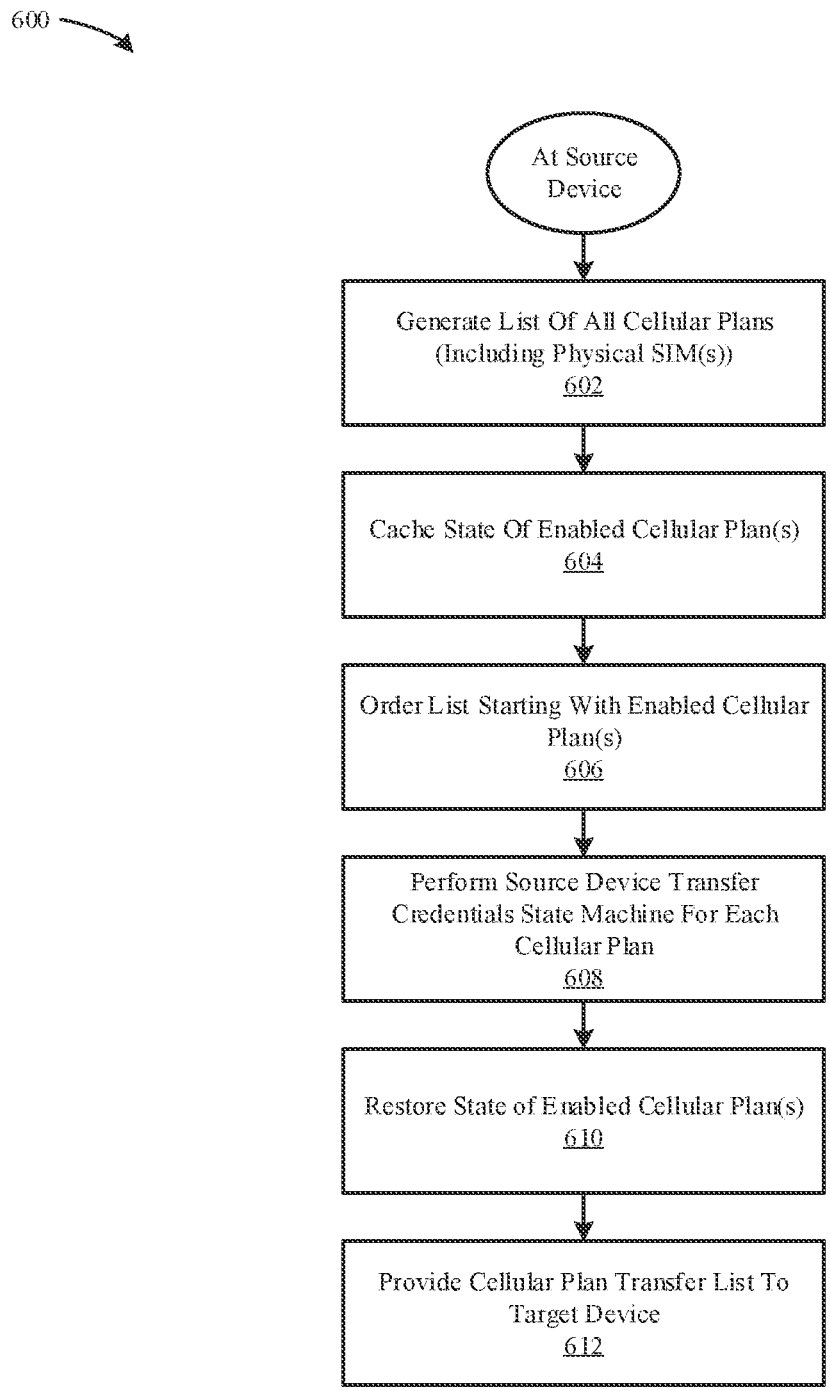
FIGS. 6A through 6C illustrate flow diagrams for exemplary actions performed at a source device for cellular plan transfers, according to some embodiments.
Figure 6B:
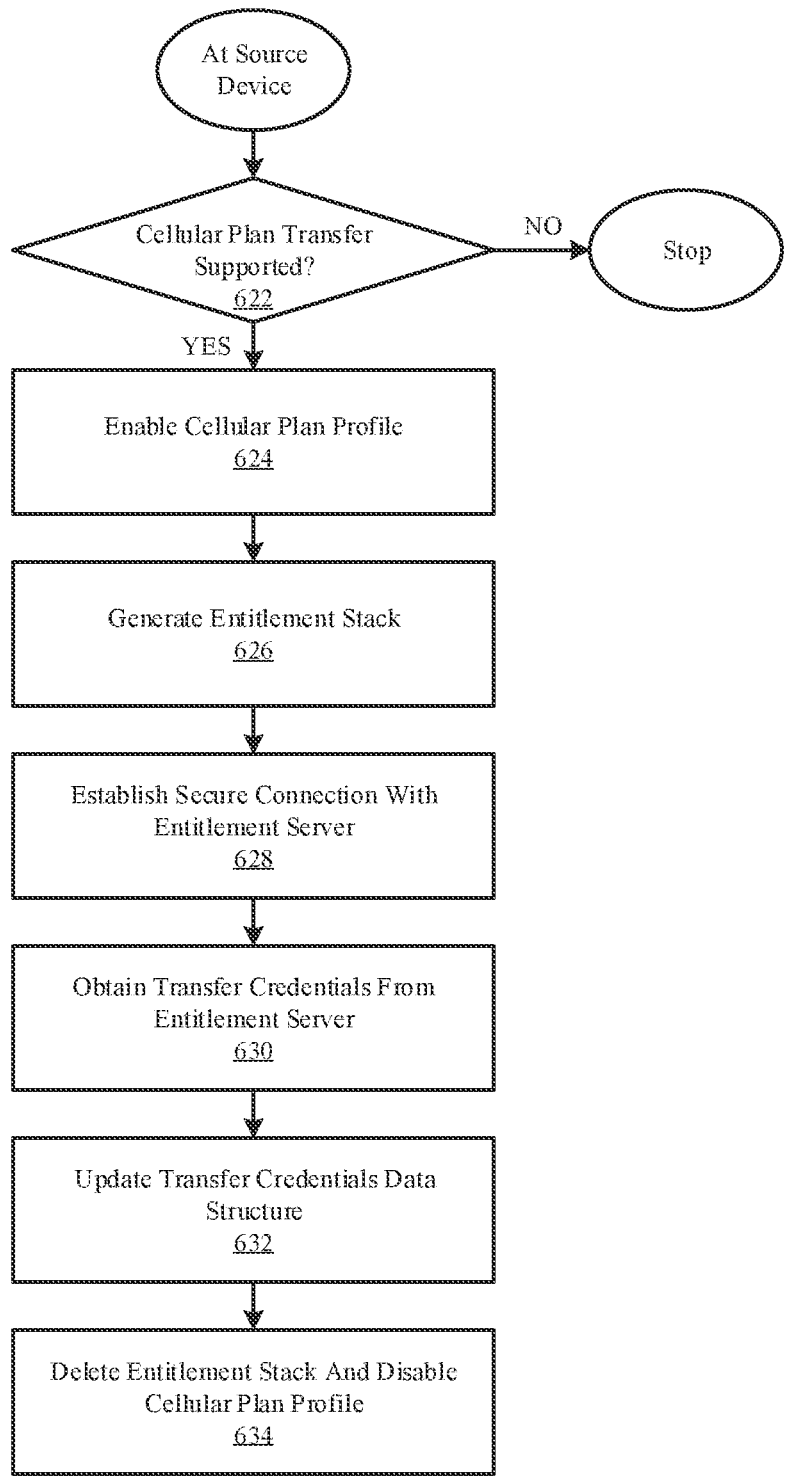
Figure 6C:
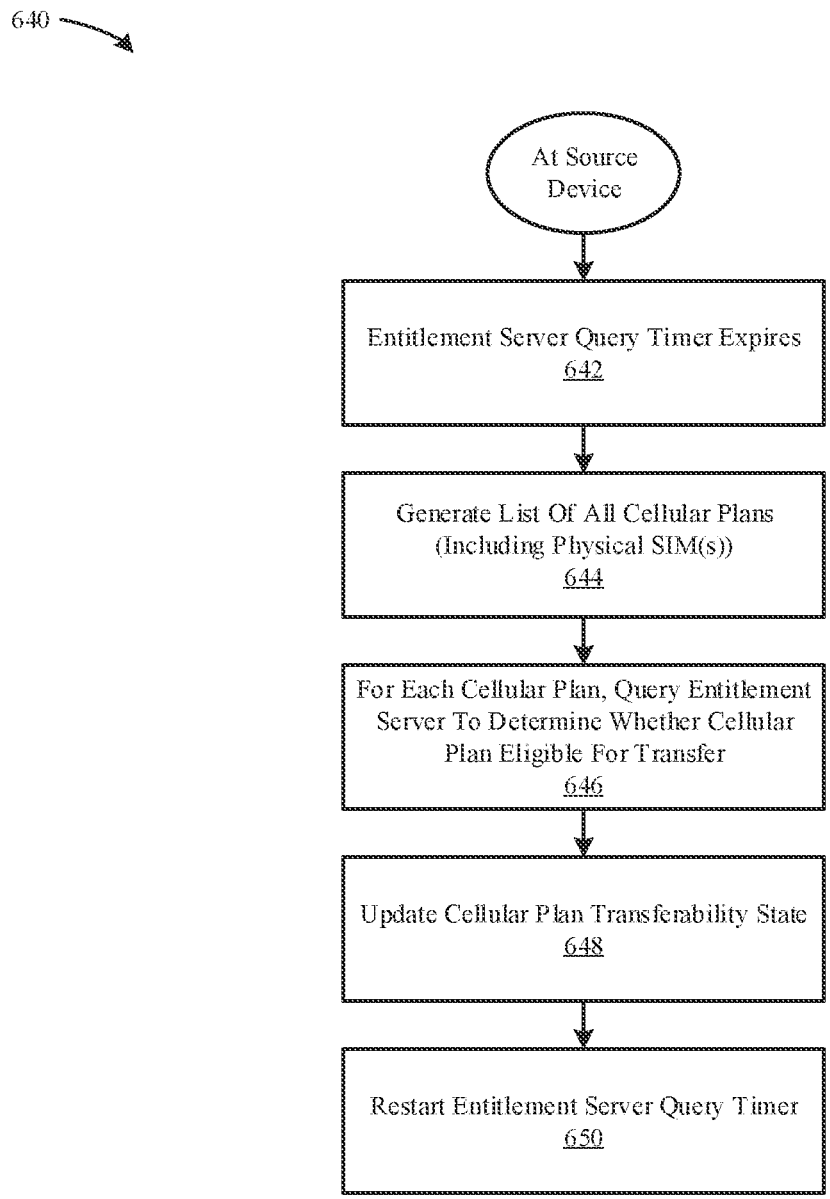

FIGS. 6A, 6B, and 6C illustrates flowcharts 600, 620, 640 actions that may be taken at a source device 110 to provide a cellular service plan transfer list to a target device 150. FIG. 6A illustrates a flowchart 600 of actions performed by the source device 110 to generate the cellular service plan transfer list. At 602, the source device 110 can generate a list of all cellular service plans for all SIMs and eSIMs included in the source device 110. At 604, the source device 110 can cache existing states for each of the SIMs and eSIMs. At 606, the source device 110 can order the list of cellular service plans starting with the cellular service plans for SIMs/eSIMs that are in an enabled (or active) state followed by the cellular service plans for SIMs/eSIMs that are in a disabled (or inactive) state. For each cellular service plan in the ordered list, at 608, the source device 110 can perform a state machine as illustrated by flowchart 620 in FIG. 6B to obtain transferability information, including in some embodiments, transfer credentials for a cellular service plan of a SIM/eSIM to be potentially transferred from the source device 110 to the target device 150. At 608, when a SIM/eSIM is not enabled (or active) for which information is to be obtained from an associated entitlement server, the source device 110 can change the state of the SIM/eSIM in order to communicated with the entitlement server. When the source device 110 restricts the number of SIMs/eSIMs that can be simultaneously active, e.g., only one eSIM at a time, a previously enabled SIM/eSIM can be disabled temporarily to allow for enabling the SIM/eSIM for which information is to be obtained. After cycling through all of the SIMs/eSIMs in the ordered list, at 610, the source device 110 can use the stored cache of previous states for the cellular service plans saved at 604 to restore the states of previously enabled SIMs/eSIMs. At 612, the source device 110 can provide a cellular service plan transfer list, including, in some embodiments, information regarding transferability, such as transfer credentials when applicable, to the target device 150.

FIG. 6B illustrates a flowchart 620 of a state machine that can be invoked at the source device 110 for each cellular service plan in an ordered cellular service plan list to obtain transferability information, such as transfer credentials or to determine transfer type for the cellular service plan. At 622, the source device 110 can determine based on information already stored or known at the source device 110 whether the cellular service plan is transferable from the source device 110 to the target device 150. In some embodiments, the source device 110 maintains information for each cellular service plan based on i) information obtained from an associated entitlement server during one or more previous entitlement queries, ii) information included in a carrier bundle provided by a third-party server, such as by a manufacturer of the source device 110, and/or iii) information included when loading and/or updating the SIM/eSIM to the source device 110. In some embodiments, a carrier bundle includes properties and/or policies for SIMs/eSIMs of one or more MNOs (carriers). In some embodiments, information regarding transferability of SIMs/eSIMs, cellular service plans, cellular service accounts, or the like for an MNO can be available at the source device 110 to determine whether a cellular service plan of the MNO can be transferred from the source device 110 to a target device 150. In some embodiments, the source device 110 obtains information about the target device 150, either directly from the target device 150 or through other communication provided to or obtained by the source device 110 prior to or during set up of the target device 150 to determine whether the target device 150 is compatible with transfer of a cellular service plan from the source device 110. When the source device 110 determines, at 622, that the cellular service plan cannot be transferred to the target device 150, the state machine for that cellular service plan concludes. When the source device 110 determines, at 622, that the cellular service plan can be transferred to the target device 150, the source device, at 624, enables the cellular service plan profile, if required, to allow for communication with an associated entitlement server. At 626, the source device 110 generates an entitlement stack for the enabled cellular service plan to use for communication with the entitlement server. In some embodiments, an entitlement stack associated with an already enabled cellular service plans can exist and need not be generated. At 628, the source device 110 establishes a secure connection with an associated entitlement server for the enabled cellular service plan. At 630, the source device 110 obtains information regarding (or to be used for) transfer of the cellular service plan from the source device 110 to the target device 150. In some embodiments, the source device 110 obtains transfer credentials to provide to the target device 150 to use for transfer of the cellular service plan. At 632, the source device updates a cellular plan transfer list data structure with information obtained regarding transfer of the cellular service plan, e.g., adding transfer credentials obtained from the entitlement server. At 634, the source device 110 deletes the entitlement stack used for communication with the entitlement server and changes the state of the enabled cellular service plan profile to a disabled state.

FIG. 6C illustrates a flowchart 640 for querying entitlement servers associated with SIMs/eSIMs of a source device 110 to determine whether cellular service plans of the SIMs/eSIMs can be transferred to another device. The source device 110 initiates performance of the actions in flowchart 640, at 642, as a result of expiration of an entitlement server query timer. At 644, the source device 644 generates a list of all cellular service plans, including all physical SIMs as well as both enabled and/or disabled eSIMs, on the source device 110. At 646, for each cellular service plan in the list, the source device queries an applicable entitlement server associated with the cellular service plan to determine transferability information, e.g., when the cellular service plan can be transferred from the source device 110 to another device. At 648, the source device updates a cellular plan transferability state maintained for the cellular service plans, e.g., in a data structure maintained at the source device 110. At 650, the source device restarts the entitlement server query timer. In some embodiments, the entitlement server queries can be performed before (and separate from) initiation of a transfer process of the cellular service plans to another device, e.g., to preload transferability information in anticipation of a subsequent transfer request. In some embodiments, information obtained from an entitlement server can be used to determine a transfer type state for a cellular service plan.

Figure 7A:
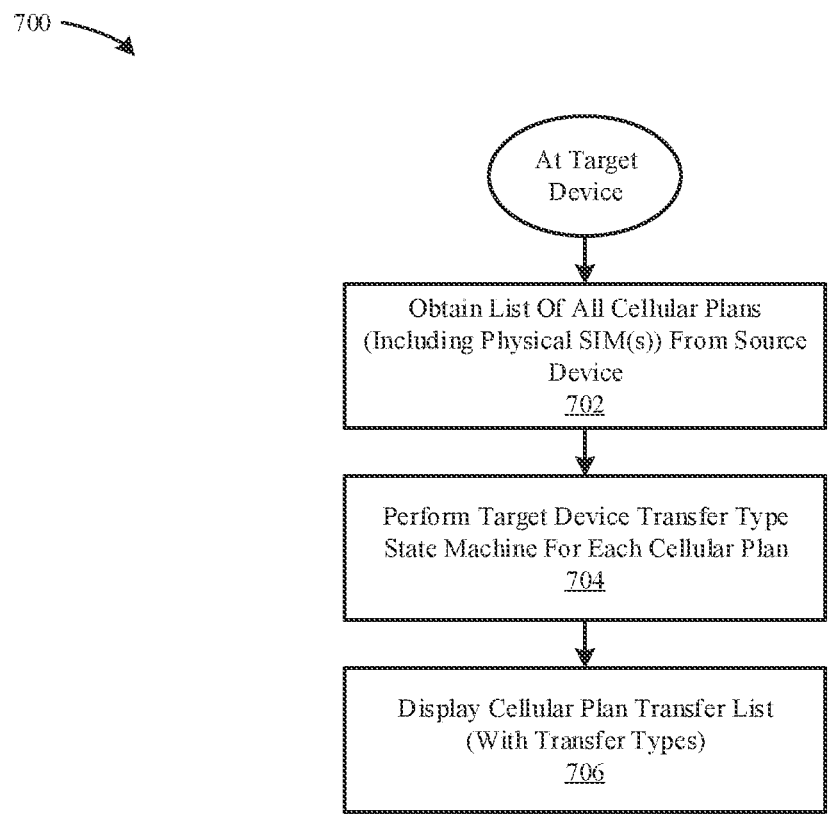
FIGS. 7A through 7E illustrate flow diagrams for exemplary actions performed at a target device for cellular plan transfers, according to some embodiments.
Figure 7B:
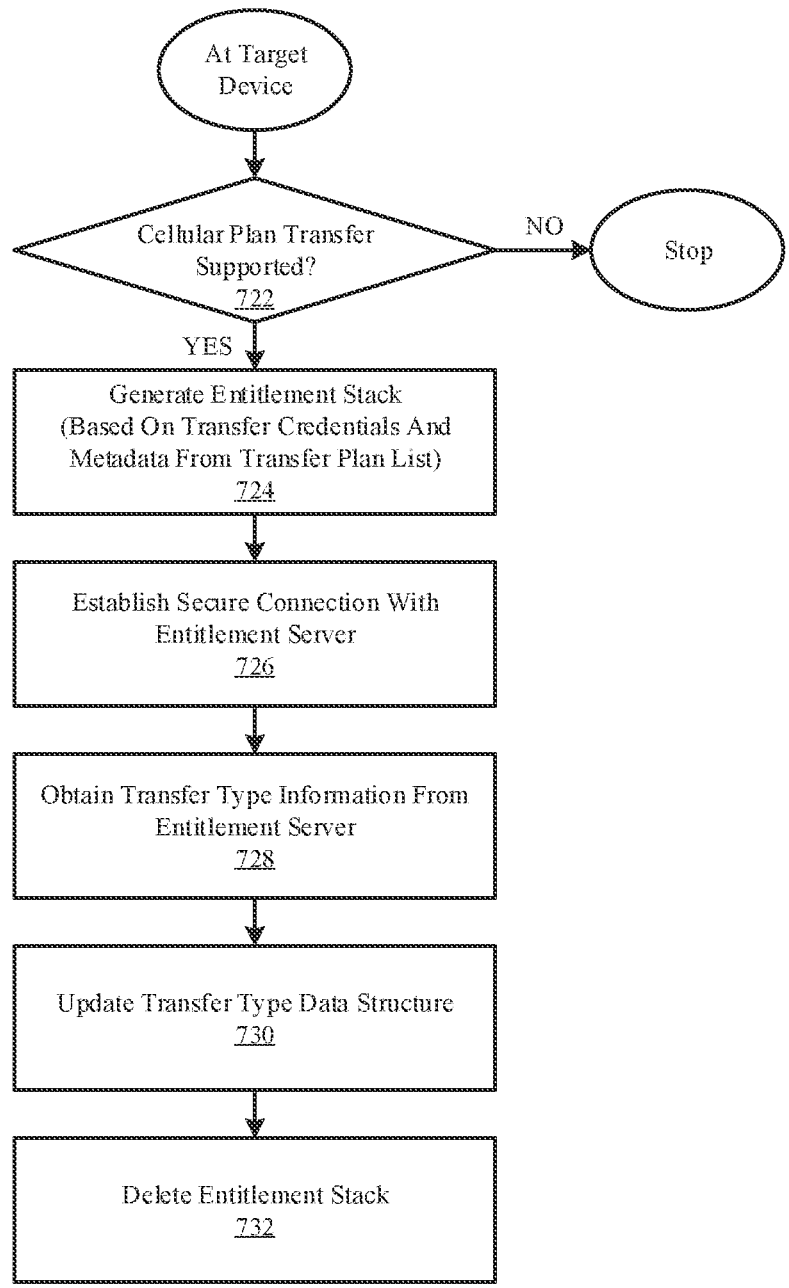

FIGS. 7A through 7E illustrate flowcharts 700, 720, 740, 760, 780 of actions that can be performed by a target device 150 as part of transfer of one or more cellular service plans from a source device 110. FIG. 7A illustrates a flowchart 700 in which a target device 150 obtains and displays a cellular service plan transfer list, e.g., to a user of the target device 150 during initial setup, subsequent configuration, or restoration of the target device 150. At 702, the target device 150 obtains a cellular plan transfer list, including all physical SIMs and non-physical eSIMs, from the source device 110. At 704, the target device 150 performs, for each cellular service plan in the cellular service plan transfer list, a state machine, such as illustrated in FIG. 7B, to obtain and/or determine a transfer type for the cellular service plan. At 706, the target device 150 displays, e.g., via a display of the target device 150, the cellular service plan transfer list, including an obtained and/or determined transfer type for each cellular service plan when available. In some embodiments, transfer types are determined based on information obtained by the target device 150 from associated entitlement servers. In some embodiments, transfer types are determined based on information obtained by (or known by the source device 110) for the cellular service plans. In some embodiments, transfer types displayed are based on information provided by the source device 110 to the target device 150 in (or accompanying) the cellular plan transfer list. In some embodiments, transfer types are not displayed for one or more cellular service plans (or an "undetermined" or "unknown status" type is displayed), such as when a transfer type is not specified or indeterminable.

FIG. 7B illustrates a flowchart 720 of a state machine that can be performed by the target device 150 for a cellular service plan to determine a transfer type for the cellular service plan. In some embodiments, the target device 150 receives a cellular service plan transfer list from a source device 110 with limited or no information regarding a transfer type for the cellular service plans included in the list. In some embodiments, the target device 150 receives from the source device 110 a cellular service plan transfer list with transfer credentials for one or more cellular service plans included in the cellular service plan transfer list. In some embodiments, the target device 150 uses one or more of the transfer credentials to communicate with entitlement servers associated with cellular service plans included in the cellular service plan transfer list, such as the determine transferability and/or to effect (at least in part) transfer of one or more cellular service plans from the source device 110 to the target device 150. At 722, the target device 150 determines whether a transfer of a cellular service plan is supported. In some embodiments, the target device 150 uses information about the cellular service plan included in the cellular service plan transfer list to determine transferability, e.g., based on a specific MNO (carrier) associated with the cellular service plan, based on capabilities of the target device 150, based on cellular service account information, or the like. In some embodiments, the target device 150 uses information provided in a carrier bundle regarding one or more MNOs (carriers) to determine transferability of the cellular service plan from the source device 110 to the target device 150. When the target device 150 determines, at 722, that the cellular service plan is not transferable, the state machine stops. When the target device 150 determines, at 722, that the cellular service plan is transferable (or potentially transferable), the target device 150 generates, at 724, an entitlement stack for the cellular service plan. In some embodiments, the entitlement stack is based at least in part on transfer credentials and/or metadata included in the cellular service plan transfer list received from the source device 110. The entitlement stack can be used by the target device 150 for communication with an entitlement server associated with the cellular service plan to be transferred. At 726, the target device 150 establishes a secure connection with the entitlement server associated with the cellular service plan. At 728, the target device 150 obtains from the entitlement server information that can be used to determine transfer type for the cellular service plan. At 730, the target device 150 updates a transfer type data structure based on the information obtained from the entitlement server regarding transferability of the cellular service plan. At 732, the target device 150 removes the entitlement stack. The state machine illustrated in FIG. 7B can be performed by the target device 150 for one or more cellular service plans in the cellular service plan transfer list.

Figure 7C:
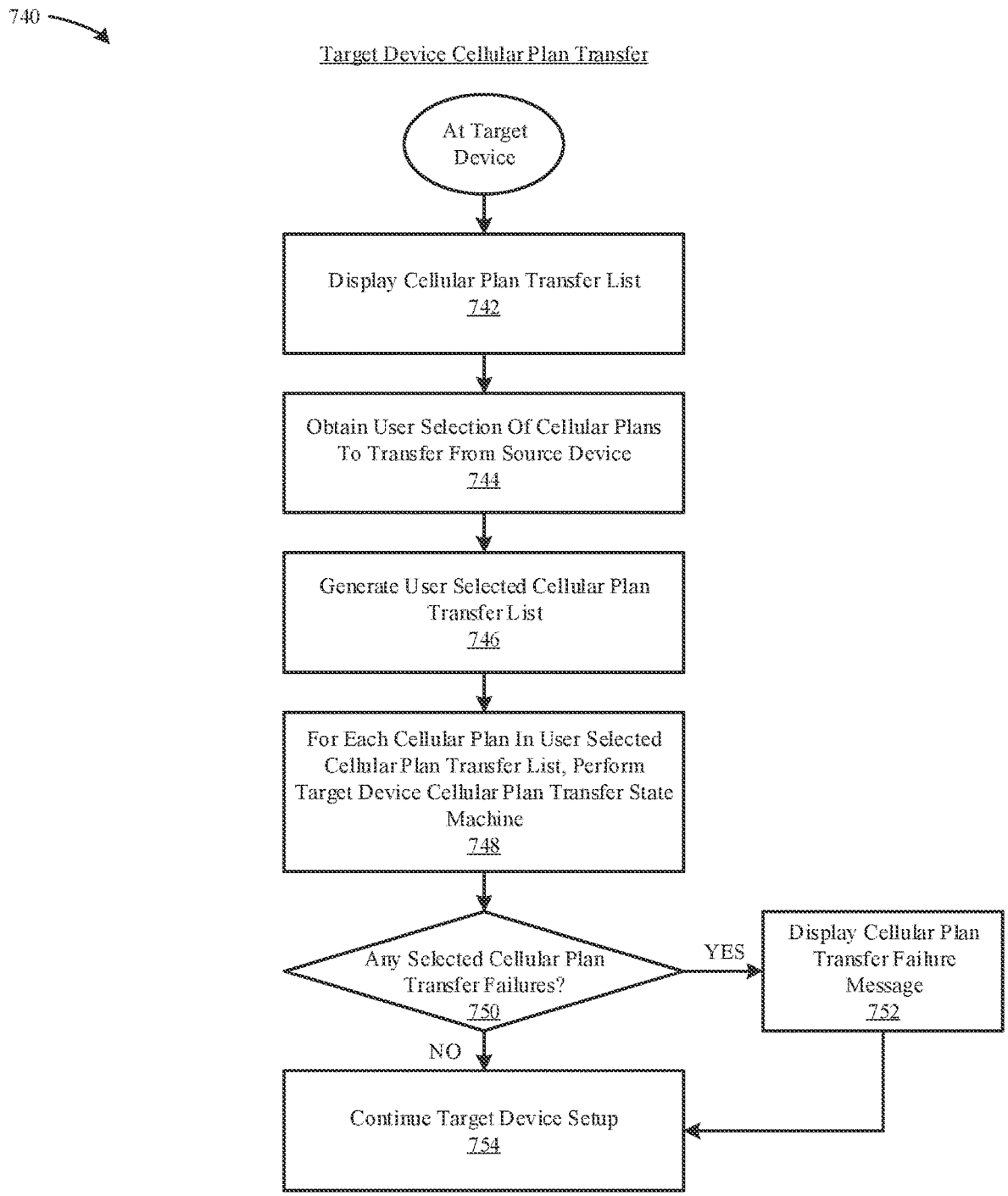

FIG. 7C illustrates a flowchart 740 that can be performed by a target device 150 as part of a cellular service plan transfer of one or more cellular service plans from a source device 110, such as during setup, reconfiguration, or restoration of the target device 150. At 742, the target device 742 displays a cellular service plan transfer list. In some embodiments, the displayed cellular service plan transfer list includes limited or no information regarding a transfer type for the cellular service plans, such as when a user provides no consent for background (or silent) enablement of SIMs/ eSIMs to determine transferability, or when limited or no information is available (or determinable) for one or more cellular service plans in the cellular service plan transfer list. In some embodiments, the displayed cellular service plan transfer list includes information regarding a transfer type for the cellular service plans, such as when a user provides consent for background (or silent) enablement of SIMs/ eSIMs to determine transferability and/or when information regarding transferability can be determined and/or obtained by the target device 150. At 744, the target device 150 obtains an indication of a selection of cellular service plans to transfer from the source device 110 to the target device 150 based on the displayed cellular service plan transfer list. In some embodiments, all cellular service plans available on the source device 110 are presented as part of the cellular service plan transfer list, whether transferable or not. In some embodiments, only transferable cellular service plans are presented in the cellular service plan transfer list. At 746, the target device 150 generates a user-selected cellular service plan transfer list based on selection of cellular service plans for which a user has provided an indication of a request to transfer from the source device 110 to the target device 150. At 748, for each cellular service plan included in the user-selected cellular service plan transfer list, the target device 150 can perform a cellular service plan transfer state machine, such as detailed further in FIG. 7D or FIG. 7E. At 750, after performing the cellular service plan transfer state machine for each selected cellular service plan in the user-selected cellular service plan transfer list, the target device 150 determines whether one or more cellular service plans failed to transfer to the target device 150. When no selected cellular service plans failed to transfer, i.e., all selected cellular service plans transferred, the target device 150, at 754, continues a process of initialization (setup), reconfiguration, or restoration of the target device 150. When at least one selected cellular service plan failed to transfer, the target device 150 can display, at 752, a message indicating the cellular service plan transfer failure. In some embodiments, the message includes an indication of which selected cellular service plans failed to transfer. In some embodiments, the message further includes an indication of which selected cellular service plans transferred successfully to the target device 150. In some embodiments, the message includes information regarding further steps for the user to re-attempt transfer of one or more of the selected cellular service plans that failed to transfer to the target device 150.

Figure 7D:
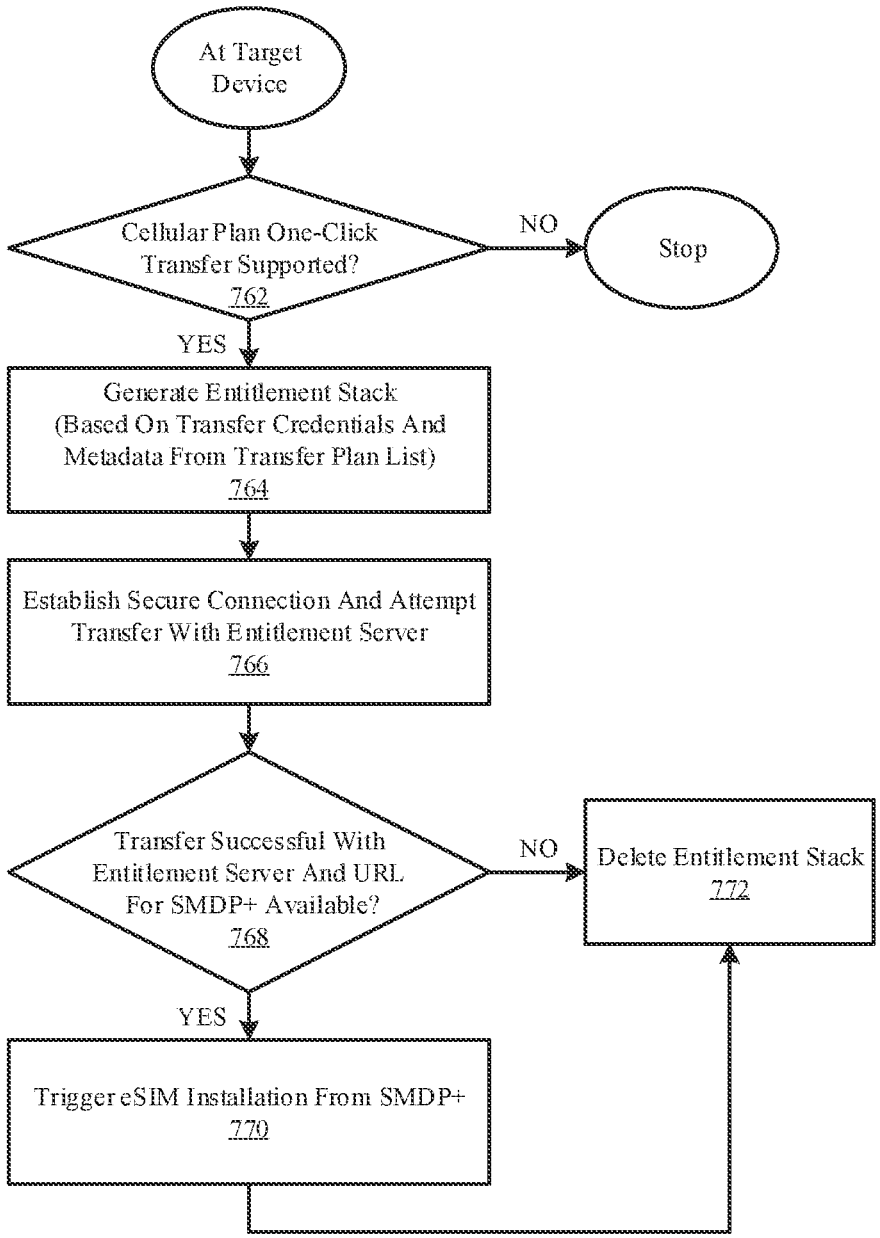

FIG. 7D illustrates a flowchart 760 of actions that can be performed by a target device 150 for a user-selected cellular service plan as part of transfer (or an attempt to transfer) the user-selected cellular service plan from a source device 110 to the target device 150. At 762, the target device 150 determines whether a one-click transfer process for the user-selected cellular service plan is supported. In some embodiments, when the user-selected cellular service plan has a transfer type of any of the following: i) transfer not supported by MNO (carrier), ii) ineligible for transfer, iii) web-sheet server required or when a transfer of the user-selected cellular service plan to the target device 150 has already occurred, the process halts. When the user-selected cellular service plan can be transferred using the one-click transfer process, at 764, the target device 150 generates an entitlement stack based on transfer credentials and/or metadata included with the cellular service plan transfer list. The target device 150 can use the entitlement stack for communication with an entitlement server associated with the user-selected cellular service plan. At 766, the target device 150 establishes a secure connection with the entitlement server and communicates with the entitlement server to transfer the user-selected cellular service plan from the source device 110 to the target device 150. At 768, the target device 150 determines whether transfer of the user-selected cellular service plan with the entitlement server is successful and, in some embodiments, whether a universal resource locator (URL) for a subscription manager data preparation (SMDP+) server associated with the transferred user-selected cellular service plan is available with which the target device 150 may communicate to download credentials, e.g., an eSIM, for the transferred user-selected cellular service plan to the target device 150. In some embodiments, when transfer is indicated as successful and an SMDP+ URL is available, e.g., as determined at 768, the target device 150, at 770, can trigger an eSIM installation to the target device 150 from the SMDP+. When transfer of the user-selected cellular service plan is not successful or when a URL for the SMDP+ from which to download credentials is not available, the target device 150 can provide an indication of failure to transfer the user-selected cellular service plan and, at 772, delete the associated entitlement stack. Failure of user-selected cellular service plans to transfer can be displayed in a message as indicated at 752 in the flowchart 740 of FIG. 7C. After successful installation of credentials, e.g., an eSIM for the transferred, user-selected cellular service plan, the entitlement stack created for communication with the entitlement server can be deleted at 772. The state machine illustrated in FIG. 7D can be implemented for each of one or more cellular service plans selected for transfer.

Figure 7E:
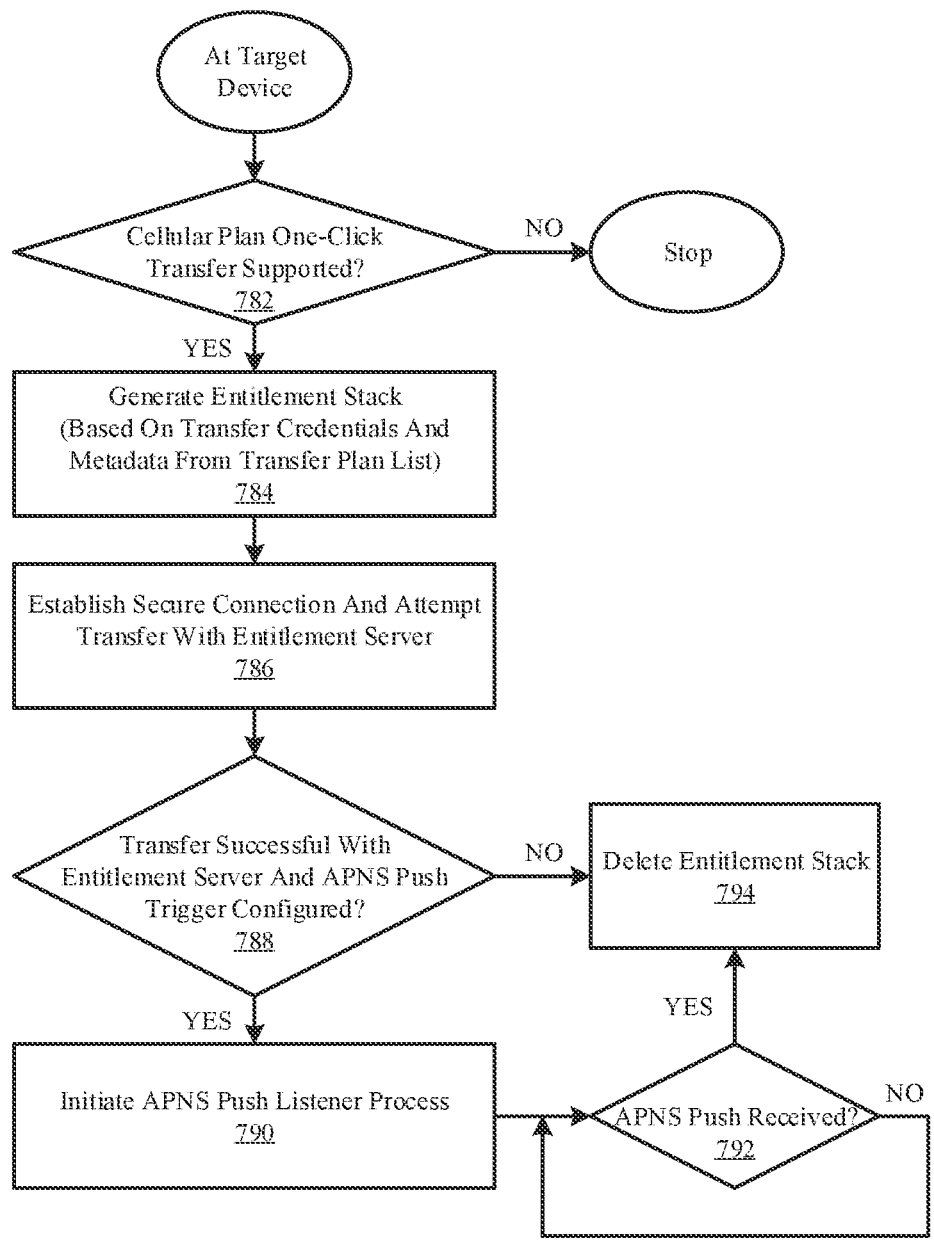

FIG. 7E illustrates a flowchart 780 of an alternative set of actions that can be performed by a target device 150 for a user-selected cellular service plan as part of transfer (or an attempt to transfer) the user-selected cellular service plan from a source device 110 to the target device 150. At 782, the target device 150 determines whether a one-click transfer process for the user-selected cellular service plan is supported. In some embodiments, when the user-selected cellular service plan has a transfer type of any of the following: i) transfer not supported by MNO (carrier), ii) ineligible for transfer, iii) web-sheet server required or when a transfer of the user-selected cellular service plan to the target device 150 has already occurred, the process halts. When the user-selected cellular service plan can be transferred using the one-click transfer process, at 784, the target device 150 generates an entitlement stack based on transfer credentials and/or metadata included with the cellular service plan transfer list. The target device 150 can use the entitlement stack for communication with an entitlement server associated with the user-selected cellular service plan. At 786, the target device 150 establishes a secure connection with the entitlement server and communicates with the entitlement server to transfer the user-selected cellular service plan from the source device 110 to the target device 150. At 788, the target device 150 determines whether transfer of the user-selected cellular service plan with the entitlement server is successful and, in some embodiments, whether installation of credentials for the transferred cellular service plan requires a push trigger from a notification server, e.g., from an Apple Push Notification Services (APNS) server. When no push trigger is required, the target device can download credentials, e.g., an eSIM, from an MNO network-based server, e.g., an SMDP+ server associated with the MNO (carrier) for the transferred user-selected cellular service plan. In some embodiments, when transfer is indicated as successful and no push notification is required, after downloading credentials for the transferred cellular service plan to the target device 150, the target device 150, at 794, can delete the associated entitlement stack. When a push notification is required to continue installation of credentials (or to complete at least in part transfer of the user-selected cellular service plan to the target device 150), at 790, the target device 150 can initiate a listening process to listen for a push notification from a notification server, e.g., from an APNS server or the like. When the push notification is received, at 792, the target device 150 can complete installation of credentials (or other processes required for transfer of the user-selected cellular service plan), such as downloading installing an eSIM to the target device 150 from an applicable network-based server. After successful installation, the target device, at 794, can delete the associated entitlement stack at 794. The state machine illustrated in FIG. 7E can be implemented for each of one or more cellular service plans selected for transfer.

In some embodiments, transfer of multiple SIMs/eSIMs from the source device 110 to the target device 150 can occur sequentially. In some embodiments, multiple push listening sessions can be created and exist in parallel. After reception of a push notification for a SIM/eSIM, the target device 150 can continue transfer by initiating installation of the SIM/eSIM, such as by downloading an eSIM or other credentials from an applicable network-based server. In some embodiments, in addition to requesting consent from a user to enable cellular service plans on the source device 110 to determine information for transferability, the target device 150 can present an option to exclude cellular service plans that are in a roaming state (or that may incur roaming charges to access an associated network-based entitlement server).

Representative Embodiments

In some embodiments, a method for efficient service plan transfer includes a source device: receiving a request for a cellular service plan transfer list from a target device; generating a list of one or more subscriber identity modules (SIMs) and/or electronic SIMS (eSIMs) included in the source device; storing an operational state for each enabled SIM and/or eSIM of the source device; determining transferability for each of the SIMs and/or eSIMs of the source device to the target device; obtaining transfer credentials for each of the SIMS and/or eSIMs that are transferrable to the target device from one or more entitlement servers associated with transferrable SIMS/eSIMs; and providing the transfer credentials with the cellular service plan transfer list to the target device.

In some embodiments, the request for the cellular service plan transfer list includes an indication of consent to enable the SIMS and/or eSIMs of the source device to access entitlement servers. In some embodiments, the cellular service plan transfer list includes a mobile station international subscriber directory number for each SIM and eSIM of the source device. In some embodiments, the cellular service plan transfer list includes a repeated list of transfer data for each SIM and eSIM of the source device. In some embodiments, the transfer data for a non-transferrable SIM or eSIM excludes transfer credentials. In some embodiments, the method further includes the source device restoring the operational state for each enabled SIM and/or eSIM after obtaining the transfer credentials.

In some embodiments, obtaining the transfer credentials for a SIM/eSIM of the source device includes the source device: generating an entitlement stack to communicate with the entitlement server associated with the SIM/eSIM; establishing a secure connection with the entitlement server; obtaining the transfer credentials for the SIM/eSIM; updating a transfer credentials data structure based on the obtained transfer credentials; and deleting the entitlement stack. In some embodiments, the method further includes the source device, when the SIM/eSIM of the source device is in a disabled or inactive state, enabling the SIM/eSIM before generating the entitlement stack, and disabling the SIM/eSIM after deleting the entitlement stack. In some embodiments, the cellular service plan transfer list includes a transfer type for each SIM/eSIM, and the transfer type provides an indication of whether the SIM/eSIM is transferable from the source device to the target device. In some embodiments, the transfer type further includes an indication of a method of transfer for each transferable SIM/eSIM of the source device. In some embodiments, determining the transferability of a SIM/eSIM includes determining whether a mobile network operator (MNO) associated with the SIM/eSIM supports transfer of the SIM/eSIM from the source device to the target device. In some embodiments, determining the transferability of a SIM/eSIM includes determining whether a subscriber account associated with the SIM/eSIM is eligible for transfer from the source device to the target device.

In some embodiments, a method for efficient cellular service plan transfer includes a target device: sending, to a source device, a request for a cellular service plan transfer list; receiving, from the source device, the cellular service plan transfer list, including transfer credentials for one or more SIMs/eSIMs of the source device; determining a transfer type for each SIM/eSIM with transfer credentials from the source device; and displaying the cellular service plan transfer list via an input/output of the target device, where the cellular service plan transfer list includes the transfer type for each SIM/eSIM with transfer credentials.

In some embodiments, the method further includes the target device obtaining, via the input/output of the target device an indication of consent to enable the SIMS and/or eSIMs of the source device to access entitlement servers, where the request for the cellular service plan transfer list includes the indication of consent. In some embodiments, determining the transfer type for a SIM/eSIM includes: generating an entitlement stack based on associated transfer credentials and metadata included in the cellular service plan transfer list; establishing a secure connection with an entitlement server associated with the SIM/eSIM; obtaining transfer type information from the entitlement server; updating a transfer type data structure for the SIM/eSIM; and deleting the entitlement stack.

In some embodiments, the method further includes the target device: obtaining, via an input/output of the target device, a user selection of cellular service plans to transfer from the source device to the target device; establishing a secure connection with an entitlement server associated with at least one cellular service plan selected for transfer; obtaining a uniform resource locator (URL) for a subscription management data preparation (SMDP+) server from the entitlement server; and downloading, from the SMDP+, credentials for the at least one cellular service plan selected for transfer.

In some embodiments, the method further includes the target device: obtaining, via an input/output of the target device, a user selection of cellular service plans to transfer from the source device to the target device; establishing a secure connection with an entitlement server associated with at least one cellular service plan selected for transfer;

obtaining an indication of successful transfer of the at least one cellular service plan from the entitlement server; determining that a push notification is required for transfer of the at least one cellular service plan; and responsive to receipt of the push notification from a push notification server, downloading credentials for the at least one cellular service plan selected for transfer. In some embodiments, the method further includes the target device: establishing a second secure connection with a second entitlement server associated with a second cellular service plan selected for transfer; obtaining an indication of successful transfer of the second cellular service plan from the second entitlement server; determining that a second push notification is required for transfer of the second cellular service plan; and responsive to receipt of the second push notification from the push notification server, downloading credentials for the second cellular service plan selected for transfer. In some embodiments, the target device waits for push notifications for multiple cellular service plans to be transferred in parallel.

Representative Exemplary Apparatus

Figure 8:
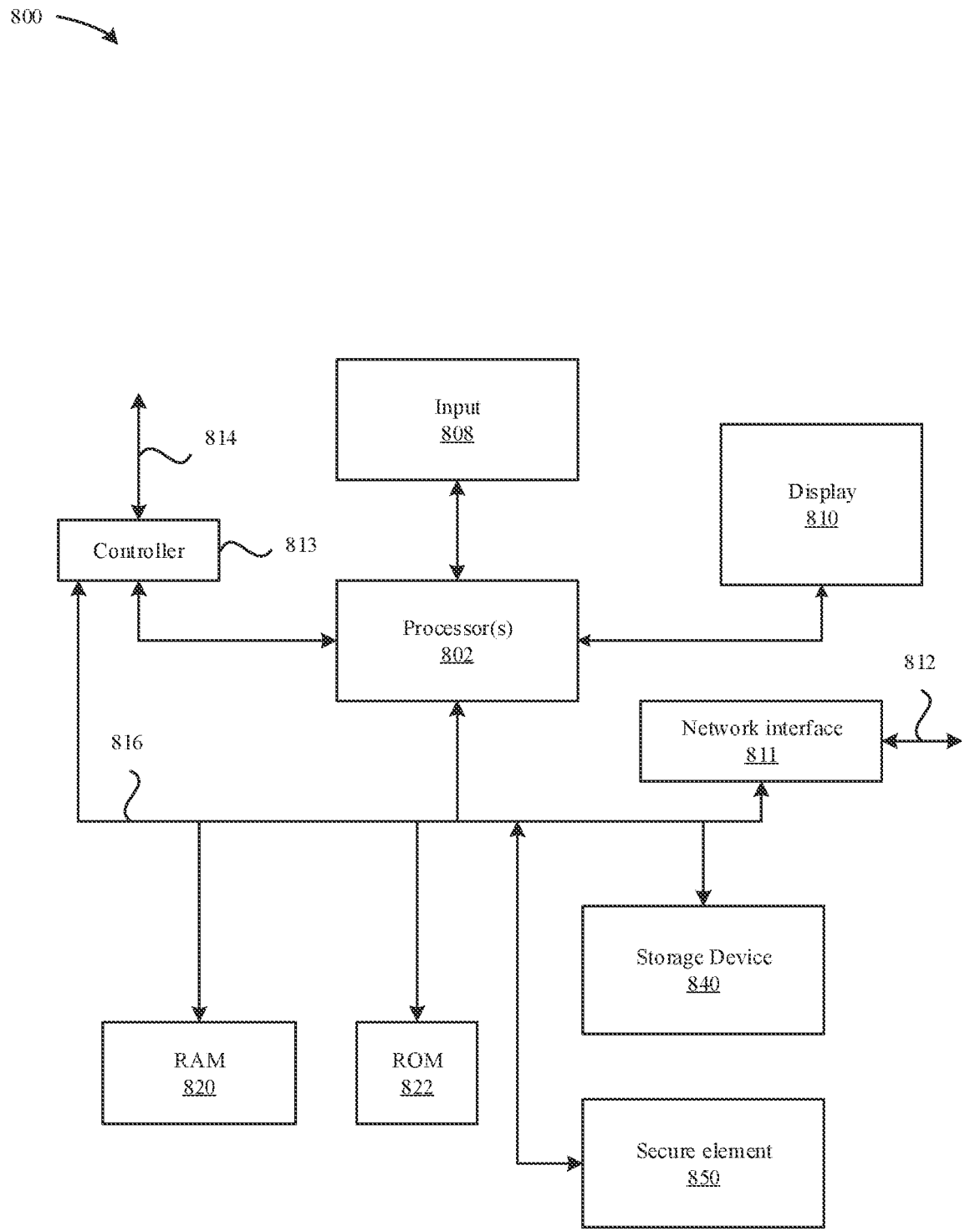
FIG. 8 illustrates a block diagram of exemplary elements of a mobile wireless device, according to some embodiments.

FIG. 8 illustrates in block diagram format an exemplary computing device 800 that can be used to implement the various components and techniques described herein, according to some embodiments. In particular, the detailed view of the exemplary computing device 800 illustrates various components that can be included in the source device 110 and/or the target device 150. As shown in FIG. 8, the computing device 800 can include one or more processors 802 that represent one or more microprocessors or controllers for controlling the overall operation of computing device 800. The one or more processors 802 of computing device 800 can correspond to the one or more processors 106 for the source device 110 and/or target device 150. In some embodiments, the computing device 800 can also include a user input device 808 that allows a user of the computing device 800 to interact with the computing device 800. For example, in some embodiments, the user input device 808 can take a variety of forms, such as a button, keypad, dial, touch screen, audio input interface, visual/image capture input interface, input in the form of sensor data, etc. In some embodiments, the computing device 800 can include a display 810 (screen display) that can be controlled by the one or more processors 802 to display information to the user (for example, information relating to an ongoing process, such as during initial setup or restoration of the computing device 800). A data bus 816 can facilitate data transfer between at least a storage device 840, the one or more processors 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry 108, such as a wireless transceiver and/or a baseband processor, that can be used to communicate with one or more cellular wireless networks 130 and/or with non-cellular wireless networks. The computing device 800 can also include a secure element 850. The secure element 850 can include an eUICC 114 and/or UICC 104.

The computing device 800 also includes a storage device 840, which can include a single storage or a plurality of storages (e.g., hard drives, memory modules), and includes a storage management module that manages one or more partitions within the storage device 840. In some embodiments, storage device 840 can include flash memory, semiconductor (solid state) memory or the like. The computing device 800 can also include a Random-Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An apparatus configured for operation in a target device, the apparatus comprising:
   one or more processors; and
   a memory communicatively coupled to the one or more processors and storing instructions that, when executed by the one or more processors, configure the target device to perform a set of actions including:
      sending, to a source device, a request for a cellular service plan transfer list;
      receiving, from the source device, the cellular service plan transfer list identifying one or more subscriber identity modules (SIMS) and/or electronic SIMs (eSIMs) of the source device, and transfer credentials for one or more transferrable SIMs/eSIMs identified in the cellular service plan transfer list;
      determining a transfer type for each SIM/eSIM of the one or more transferrable SIMs/eSIMs; and
      presenting the cellular service plan transfer list via a display of the target device,
      wherein the cellular service plan transfer list includes the transfer type for each transferrable SIM/eSIM.

2. The apparatus of claim 1, wherein the target device determines the transfer type for a transferrable SIM/eSIM by at least:
   generating an entitlement stack based on associated transfer credentials and metadata included in the cellular service plan transfer list for the transferrable SIM/eSIM;
   establishing a secure connection with an entitlement server associated with the transferrable SIM/eSIM;
   obtaining transfer type information from the entitlement server;
   updating a transfer type data structure for the transferrable SIM/eSIM; and
   deleting the entitlement stack.

3. The apparatus of claim 1, wherein execution of the instructions further configure the target device to:
   obtain a user selection of a cellular service plan to transfer from the source device to the target device;
   establish a secure connection with an entitlement server associated with the cellular service plan selected for transfer;
   obtain a network address for a provisioning server from the entitlement server; and
   download, from the provisioning server, credentials for the cellular service plan selected for transfer.

4. The apparatus of claim 1, wherein execution of the instructions further configure the target device to:
   obtain a user selection of a cellular service plan to transfer from the source device to the target device;
   establish a secure connection with an entitlement server associated with the cellular service plan selected for transfer;
   obtain an indication of successful transfer of the cellular service plan from the entitlement server;
   determine that a push notification is required for transfer of the cellular service plan; and
   responsive to receipt of the push notification from a push notification server, download credentials for the cellular service plan selected for transfer.

5. The apparatus of claim 4, wherein execution of the instructions further configure the target device to:
   obtain a user selection of a second cellular service plan to transfer from the source device to the target device;
   establish a second secure connection with a second entitlement server associated with the second cellular service plan selected for transfer;
   obtain an indication of successful transfer of the second cellular service plan from the second entitlement server;
   determine that a second push notification is required for transfer of the second cellular service plan; and
   responsive to receipt of the second push notification from the push notification server, download credentials for the second cellular service plan selected for transfer.

6. The apparatus of claim 5, wherein the target device waits for push notifications for multiple cellular service plans to be transferred in parallel.

7. A source device, comprising:
   wireless circuitry comprising one or more antennas;
   one or more processors communicatively coupled to the wireless circuitry and to a memory storing instructions that, when executed on the one or more processors, configure the source device to:
      receive, from a target device, a request for a cellular service plan transfer list;
      generate the cellular service plan transfer list identifying one or more subscriber identity modules (SIMS) and/or electronic SIMs (eSIMs) of the source device;
      determine transferability, from the source device to the target device, of each SIM and/or eSIM identified in the cellular service plan transfer list;
      obtain, from one or more entitlement servers, transfer credentials for each SIM and/or eSIM identified in the cellular service plan transfer list that is transferrable to the target device; and
      provide, to the target device, the transfer credentials and the cellular service plan transfer list.

8. The source device of claim 7, wherein execution of the instructions further configure the source device to:
store, in a memory of the source device, an operational state for each SIM and/or eSIM identified in the cellular service plan transfer list and enabled on the source device prior to determining transferability.

9. The source device of claim 8, wherein execution of the instructions further configure the source device to:
restore, from the memory of the source device, the operational state for each SIM and/or eSIM identified in the cellular service plan transfer list and enabled on the source device after obtaining the transfer credentials.

10. The source device of claim 7, wherein the request for the cellular service plan transfer list includes an indication of consent to enable the SIMs and/or eSIMs of the source device to access entitlement servers.

11. The source device of claim 7, wherein the cellular service plan transfer list includes a mobile station international subscriber directory number for each SIM and eSIM of the source device.

12. The source device of claim 7, wherein the cellular service plan transfer list includes a repeated list of transfer data for each SIM and eSIM of the source device.

13. The source device of claim 12, wherein the transfer data for a non-transferrable SIM or eSIM excludes transfer credentials.

14. The source device of claim 7, wherein the source device obtains the transfer credentials for a SIM/eSIM of the source device by at least:
generating an entitlement stack to communicate with the entitlement server associated with the SIM/eSIM;
establishing a secure connection with an entitlement server of the one or more entitlement servers;
obtaining the transfer credentials for the SIM/eSIM;
updating a transfer credentials data structure based on the obtained transfer credentials; and
deleting the entitlement stack.

15. The source device of claim 14, wherein execution of the instructions further configure the source device to perform the following actions when the SIM/eSIM of the source device is in a disabled or inactive state:
enabling the SIM/eSIM before generating the entitlement stack; and
disabling the SIM/eSIM after deleting the entitlement stack.

16. The source device of claim 7, wherein:
the cellular service plan transfer list includes a transfer type for each SIM/eSIM; and
the transfer type provides an indication of whether the SIM/eSIM is transferable from the source device to the target device.

17. The source device of claim 16, wherein the transfer type further includes an indication of a method of transfer for each transferable SIM/eSIM of the source device.

18. The source device of claim 7, wherein the source device determines the transferability of a SIM/eSIM by at least determining whether a mobile network operator (MNO) associated with the SIM/eSIM supports transfer of the SIM/eSIM from the source device to the target device.

19. The source device of claim 7, wherein the source device determines the transferability of a SIM/eSIM by at least determining whether a subscriber account associated with the SIM/eSIM is eligible for transfer from the source device to the target device.

20. A target device, comprising:
wireless circuitry comprising one or more antennas; and
one or more processors communicatively coupled to the wireless circuitry and to a memory storing instructions that, when executed on the one or more processors, configure the target device to:
send, to a source device, a request for a cellular service plan transfer list;
receive, from the source device, the cellular service plan transfer list identifying one or more subscriber identity modules (SIMs) and/or electronic SIMs (eSIMs) of the source device, and transfer credentials for one or more transferrable SIMs/eSIMs identified in the cellular service plan transfer list;
determine a transfer type for each SIM/eSIM of the one or more transferrable SIMs/eSIMs; and
present the cellular service plan transfer list via a display of the target device,
wherein the cellular service plan transfer list includes the transfer type for each transferrable SIM/eSIM.

* * * * *